United States Patent [19]

Meyer

[11] Patent Number: 5,251,594
[45] Date of Patent: Oct. 12, 1993

[54] NUTATING INTERNAL COMBUSTION ENGINE

[76] Inventor: Leonard Meyer, 122 Tanglewood Dr., Elk Grove Village, Ill. 60007

[21] Appl. No.: 815,232

[22] Filed: Dec. 31, 1991

[51] Int. Cl.⁵ .............. F02B 53/00; F01C 9/00
[52] U.S. Cl. ............................ 123/228; 418/53
[58] Field of Search .......... 123/221, 228, 231; 418/51, 52, 53, 83, 142

[56] References Cited

U.S. PATENT DOCUMENTS

| | | |
|---|---|---|
| Re. 29,230 | 5/1977 | Sarich . |
| 263,573 | 8/1882 | Patten . |
| 660,383 | 10/1900 | Lambert . |
| 714,823 | 12/1902 | Samain . |
| 773,206 | 10/1904 | Hall . |
| 790,264 | 5/1905 | Roseland . |
| 865,891 | 9/1907 | Heberling . |
| 876,202 | 1/1908 | Le'ge' . |
| 1,306,639 | 6/1919 | Soemer . |
| 1,986,454 | 1/1935 | Wicha ............... 418/53 |
| 2,013,126 | 2/1936 | Peschl . |
| 2,056,088 | 9/1936 | Berry . |
| 2,069,646 | 2/1937 | Cohen . |
| 2,173,663 | 9/1939 | Raymond . |
| 2,278,696 | 4/1942 | George . |
| 2,468,451 | 4/1949 | Kutzner ............ 123/231 X |
| 2,992,635 | 7/1961 | Nasvytis . |
| 3,102,517 | 9/1963 | Day et al. . |
| 3,492,974 | 2/1970 | Kreimeyer . |
| 3,895,610 | 7/1975 | Wahl . |
| 3,907,468 | 9/1975 | Green et al. .......... 418/83 |
| 3,942,384 | 3/1976 | Parker ............... 418/53 X |
| 3,981,639 | 9/1976 | Wahl . |
| 4,094,202 | 6/1978 | Kemper . |
| 4,203,396 | 5/1980 | Berger . |
| 4,274,815 | 6/1981 | Lechler et al. ...... 418/142 X |
| 4,462,760 | 7/1984 | Sarich et al. . |
| 4,519,356 | 5/1985 | Sarich . |
| 4,945,886 | 8/1990 | McKay et al. . |
| 4,951,615 | 8/1990 | Pahis . |
| 5,138,993 | 8/1992 | Kim ................. 418/53 X |

FOREIGN PATENT DOCUMENTS 475138 10/1975 Australia .............. 418/53
207400 2/1984 German Democratic Rep. ... 418/53

Primary Examiner—Michael Koczo
Attorney, Agent, or Firm—Cook, Egan, McFarron & Manzo, Ltd.

[57] ABSTRACT

A nutating internal combustion engine is disclosed including a disc having cone-shaped surfaces and a centrally disposed sphere positioned within a symmetrical, spherical-segment shaped chamber which is adapted to contain the disc and has a central bearing to movably engage the sphere and to allow the disc to nutate within the chamber to turn drive shafts. Preferably, the engine operates on a four cycle principle and combines the intake and compression chambers into a single chamber and the combustion and exhaust chambers into a single chamber to fire every 180 degrees.

54 Claims, 23 Drawing Sheets

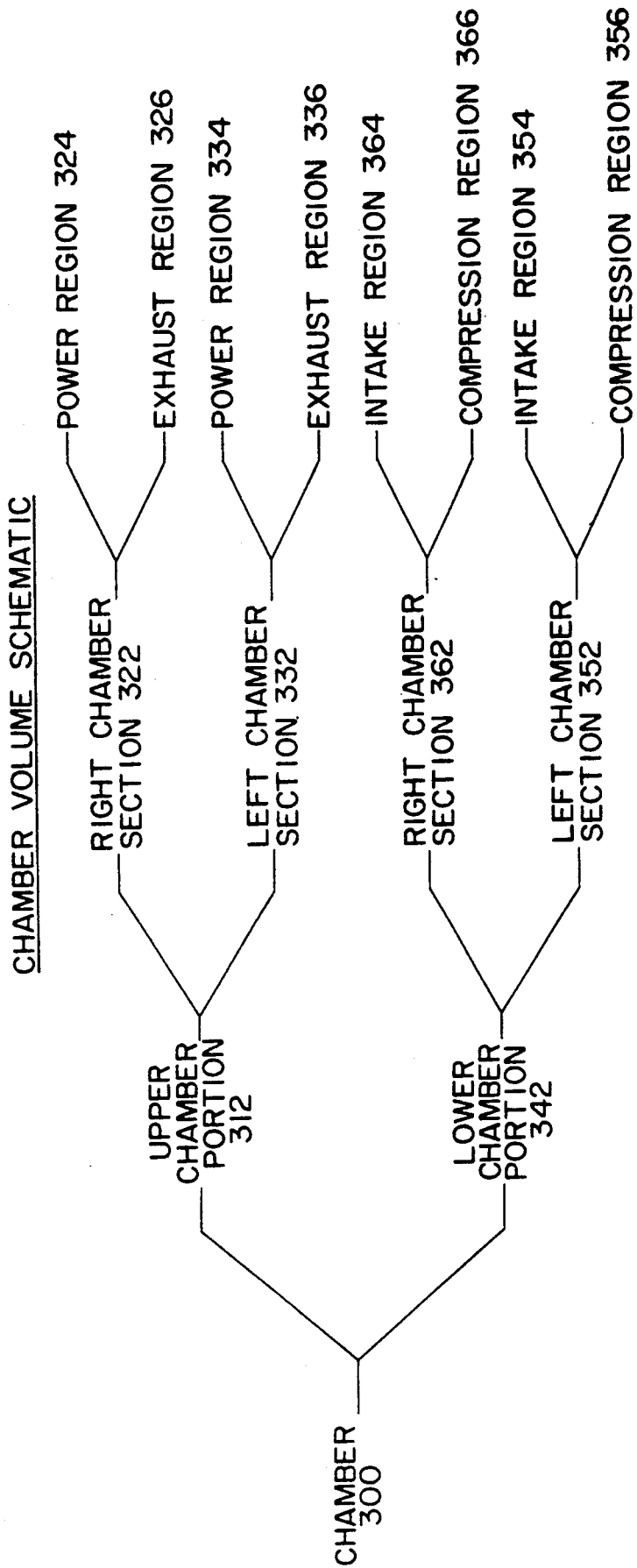

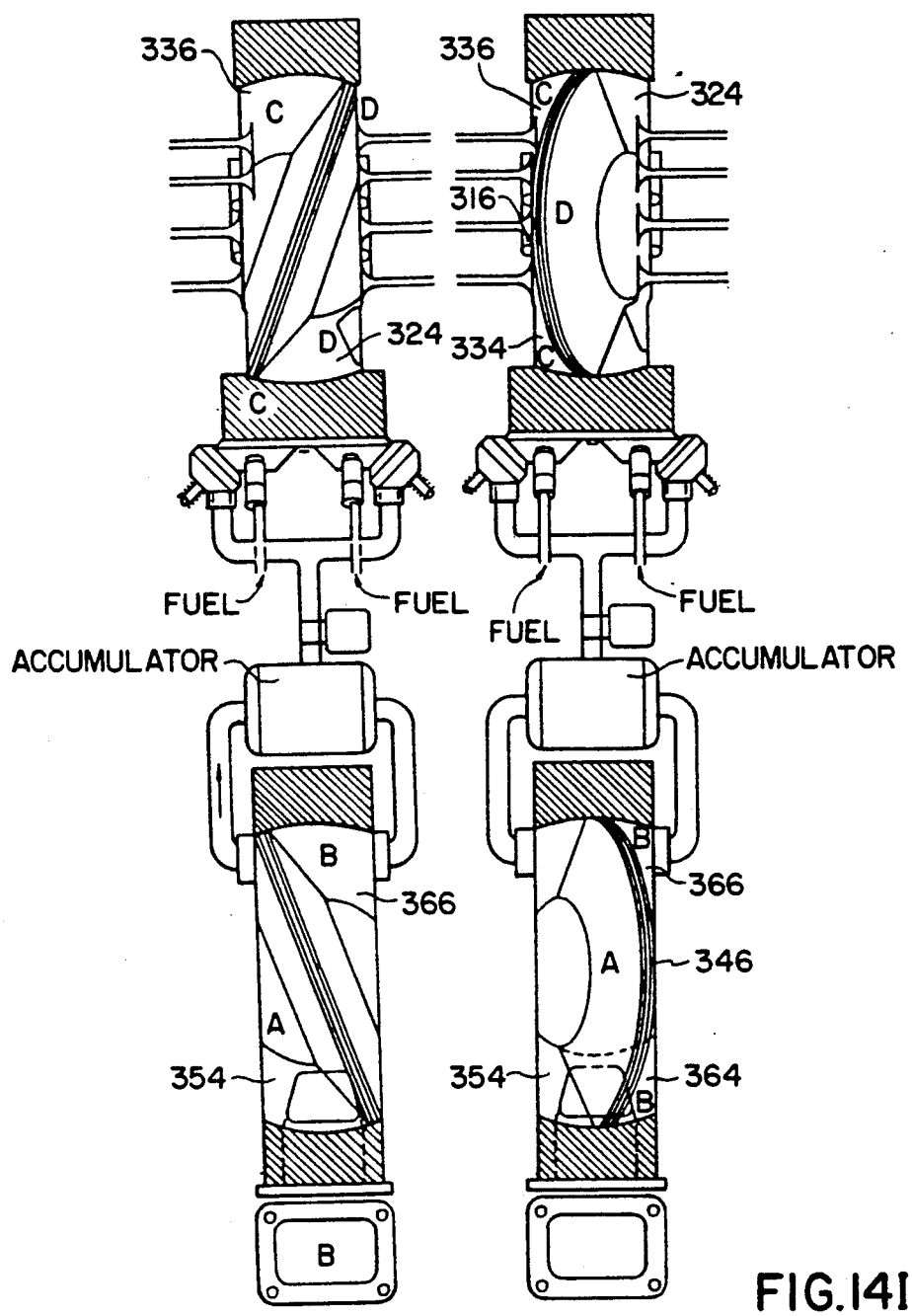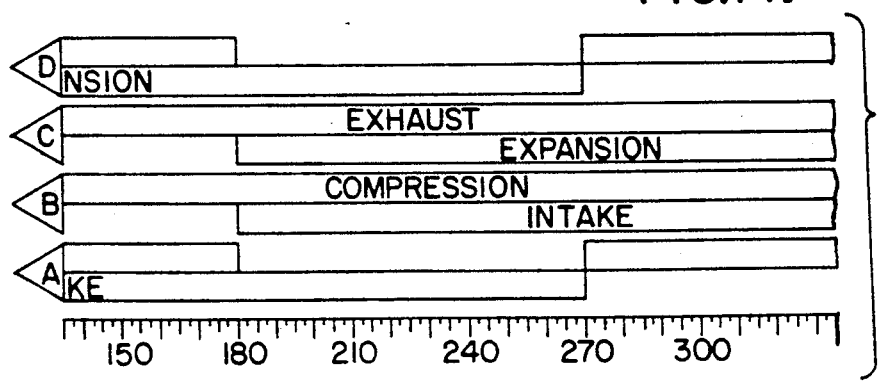

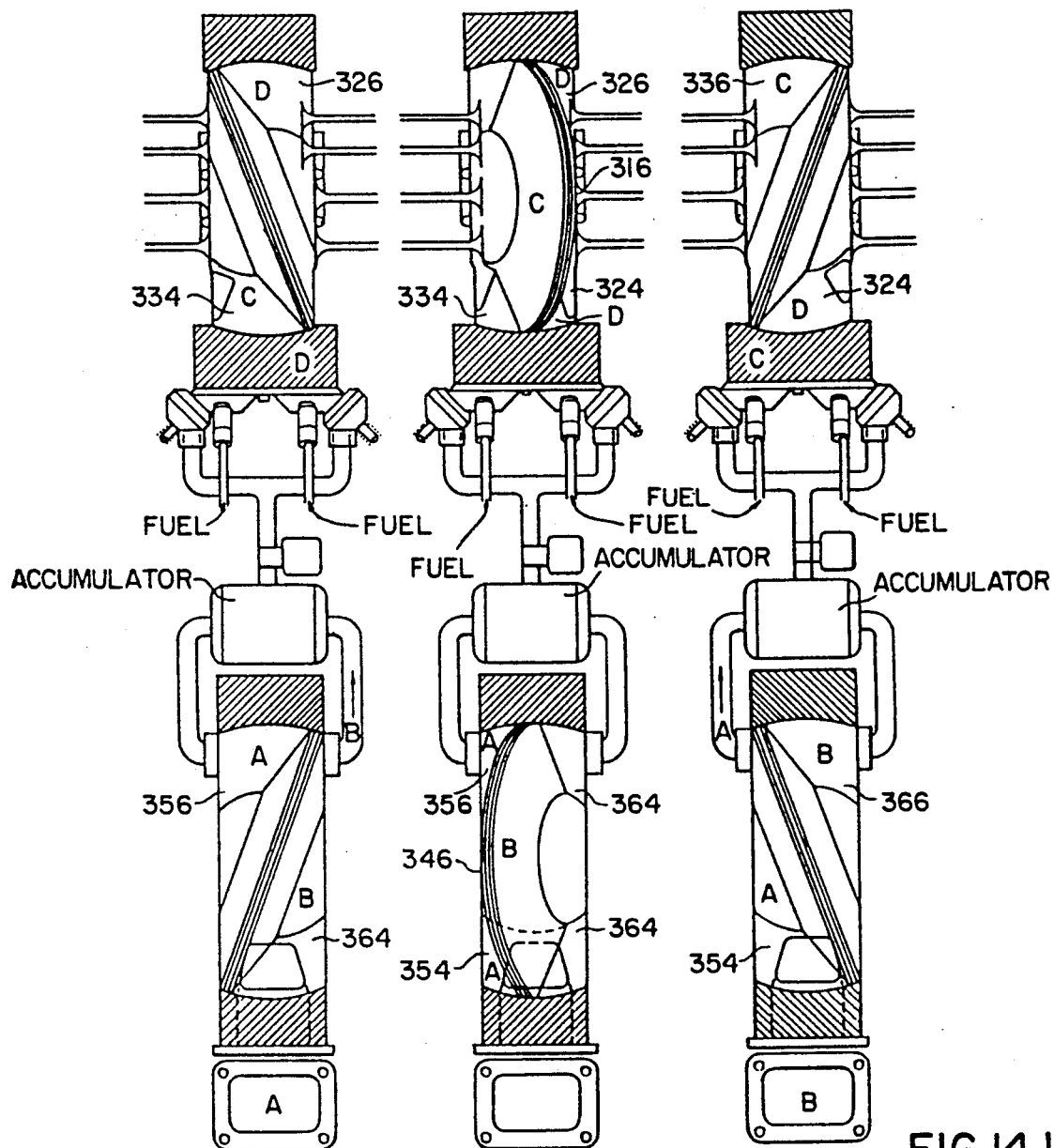

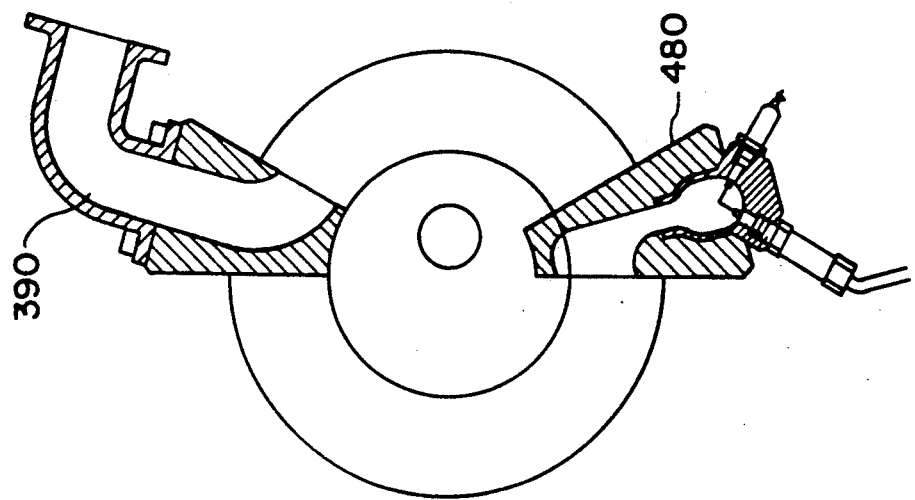
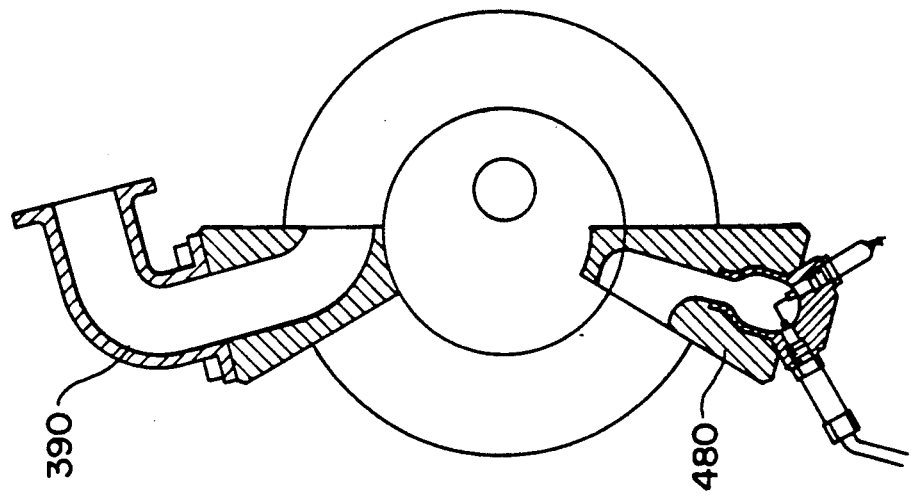
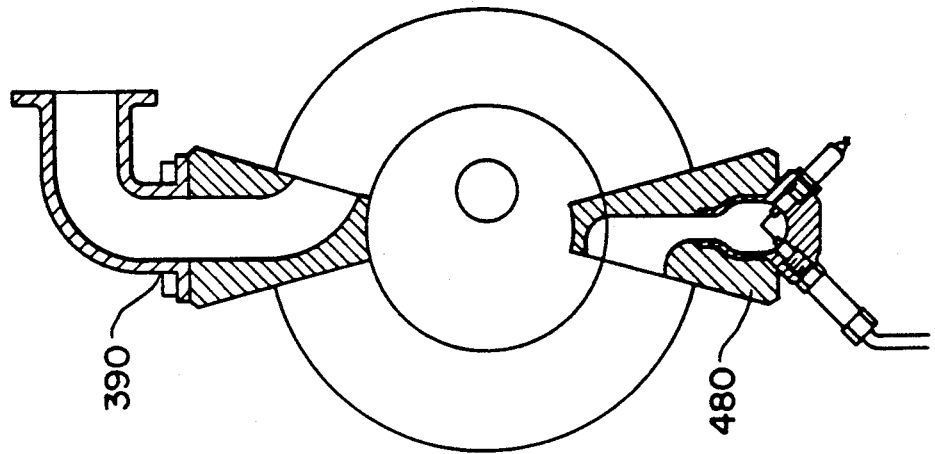

NUTATING INTERNAL COMBUSTION ENGINE

FIELD OF THE INVENTION

This invention relates to a nutating internal combustion engine and more particularly to a high efficiency nutating internal combustion engine. The present invention comprises a nutating internal combustion engine including a disc having cone-shaped surfaces and a centrally disposed sphere positioned within a symmetrical, spherical-segment shaped chamber which is adapted to contain the disc and has a central bearing to movably engage the sphere and to allow the disc to nutate within the chamber to turn drive shafts. Preferably, the engine operates on a four cycle principle and combines the intake and compression chambers into a single chamber and the combustion and exhaust chambers into a single chamber to fire every 180 degrees.

DESCRIPTION OF THE PRIOR ART

The four stroke internal combustion engine has been used for more than a century. The concept of precession and nutation of bodies in mechanics has been known even longer. The transfer of energy from the rotational motion of a nutating body to some other form of motion has also been known. While the concept of using a nutating body in an internal combustion engine has been tried, it has not shown much success. Until the apparatus disclosed in the present application, the efficient use of the nutating body to define chambers of an internal combustion engine has been even less successful.

Generally, the precession of a body is the effect exhibited by a spinning body (e.g. a top), when an applied torque tends to change the direction of its rotational axis, causing this axis to generate a cone-shaped pattern and to turn at right angles to the direction of the torque. Nutation refers to the periodic variation in the inclination from the vertical of the precessing rotation axis of a spinning body (e.g. a top).

The fundamental elements of any nutating engine include a spherical object with a shaft extending through the sphere along the axis of the sphere. The sphere and shaft are positioned within a chamber whereby a sphere and shaft move in such a way that the motion of the shaft follows a cone shape. The overall effect of nutation is that there is a wobble without net rotation.

Nutating elements have been used to transfer energy in various mechanical devices. For example, as early as 1904, U.S. Pat. 773,206 issued to F. E. Hall discloses a gasoline engine whose pistons drive a ball and shaft in a nutating motion to turn a drive shaft. Similarly, in 1908, U.S. Pat. No. 876,202 discloses a motion transmitting device for engines whereby the nutating element is a linkage between pistons and a drive shaft. Specifically, the pistons drive arms of the nutating element thereby driving a shaft in a nutating motion, sweeping out a cone-shaped pattern. The energy of the shaft is transferred through a gear mechanism to drive a separate drive shaft.

Various other patents also use the nutating ball and shaft element to transfer motion from one form to another. In 1942 U.S. Pat. No. 2,278,696 described nutating elements applied to a rotary engine. This reference describes the pistons as being attached to arms which are perpendicular to a shaft. The shaft rotated around a pivot point in the center to generate two conically shaped rotations. The ends of the shaft are affixed to a means which rotated a separate drive shaft. The shaft moves in the ball and disc arrangement by means of a bearing. However, all the references discussed only use the nutating ball and shaft as a means to transmit one type of motion into another. None of the references use the actual nutating elements (i.e. ball and disc, and shaft, etc.) to define chambers used in the internal combustion engine.

In 1963, U.S. Pat. No. 3,102,517 issued to Day discloses a nutating disc internal combustion engine which operates on the nutating body concept. The nutating disc arrangement itself is an integral part of the actual internal combustion engine cycles. Specifically, the ball and disc define chambers which are the intake, compression, combustion and exhaust chambers. The engine disclosed by Day includes an internal combustion engine comprising a housing surrounding and supporting a spherical surface including a disc which separates the chamber into two chambers and a single stop which communicates between the two halves of the chamber. As the sphere and disc rotate in a nutating manner, the chambers for intake, compression, combustion and exhaust interact in such a way as to drive the shaft. The engine as a whole disclosed by Day fires every 360 degrees.

The engine disclosed by Day provides only one drive shaft. Therefore, the center of mass of the ball and shaft element is not at the center of the ball. Unlike the nutating engine disclosed in the present application, the center of mass of the ball and shaft is constantly moving, placing additional stresses on the engine. Because the Day reference discloses only one stop, the Day device has either two or three chambers. In addition, the intake and compression strokes are accomplished simultaneously on one side of the disc and the expansion and exhaust strokes are accomplished on the other side of the disc. Therefore, both sides of the disc are required to complete a single four stroke process.

An object of the present invention is to provide a nutating internal combustion engine which combines the intake/compression chambers into a single chamber and the combustion/exhaust chambers into a single chamber on each side of the engine.

Another object of the invention is to provide an internal combustion engine which fires every 360 degrees per side, with each side being 180 degrees out of phase. Thereby, this internal combustion engine as a whole fires every 180 degrees.

Another object of the invention is to reduce the size of the internal combustion engine by combining the chambers for intake/compression and combustion/exhaust.

Another object of the invention is to reduce the size of the internal combustion engine by sharing chambers whereby the volume in the lower region is used for intake/compression on both sides of the disc and the area in the upper region is used for combustion/exhaust on both sides of the disc.

SUMMARY OF THE INVENTION

The present invention comprises a nutating internal combustion engine including a disc having cone-shaped surfaces and a centrally disposed sphere. A symmetrical, spherical-segment shaped chamber is adapted to contain the disc and has a central bearing to movably engage the sphere and to allow the disc to nutate within the chamber. The crankshaft is rotationally disposed on the axis of the disc within the sphere and the drive shafts are disposed on the axis of the chamber positioned on both sides of the chamber. The drive shafts are eccentrically affixed to the crankshaft whereby the nutating motion of the disc causes the drive shafts to turn. In the preferred embodiment, the disc has two gaps positioned 180 degrees apart. The chamber has a like number of stops which are aligned with gaps in the disc to divide the chamber into intake/compression and combustion/exhaust sections to allow each side of the engine to fire every 360 degrees and to allow the engine as a whole to fire every 180 degrees.

Other embodiments of the present invention also provide different configurations for the stops. One configuration includes more than two stops and gaps. Another configuration includes moving the two stops from a configuration where the stops are aligned at 180 degrees apart to some other angle. Specifically, the movement of the stops to a position different than 180 degrees allows for a larger chamber and a smaller chamber above and below the stops respectively. This configuration allows for intake and compression in a smaller chamber and combustion and exhaust in a larger chamber, thereby making the Atkinson cycle a practical result. Alternatively, the intake/compression chamber can be larger than the expansion/exhaust chamber, effectively creating a self-supercharging cycle. In addition, this configuration could be used as a pump or an air compressor.

BRIEF DESCRIPTION OF THE DRAWINGS

FIG. 14 is a diagram showing the composition of the various chambers, sections and regions within the engine.

FIGS. 14a–g are cross-sectional views of the chamber showing the moving fulcrum effect of the disc to produce secondary chambers.

FIGS. 14h, 14i, and 14j show the function of the various regions as the engine rotates through the stages shown in FIGS. 14a–g.

FIG. 16a shows the configuration of a single injector embodiment of the nutating engine.

FIG. 16a-1 shows the timing of the fuel and air input for the engine configuration shown in FIG. 16a.

FIG. 16b-1 shows the timing of the fuel and air input for the engine configuration shown in FIG. 16b.

FIGS. 17a–c show the various configurations of the stops to allow the engine to operate on the Otto cycle, the self supercharging cycle, and the Atkinson Cycle.

DESCRIPTION OF THE PREFERRED EMBODIMENTS

The present invention comprises an internal combustion engine based on the mechanical principle that variable volumes can be produced by a bisected conical disc exhibiting nutating motion while in simultaneous physical contact with two parallel flat walls of a chamber. This single bisected conical disc 110 is the power producing element. The symmetrical configuration and shared chambers constitute an efficient use of physical space. This configuration substantially increases the power to weight ratio and power density with potential reduction in fuel consumption.

Figure 5:
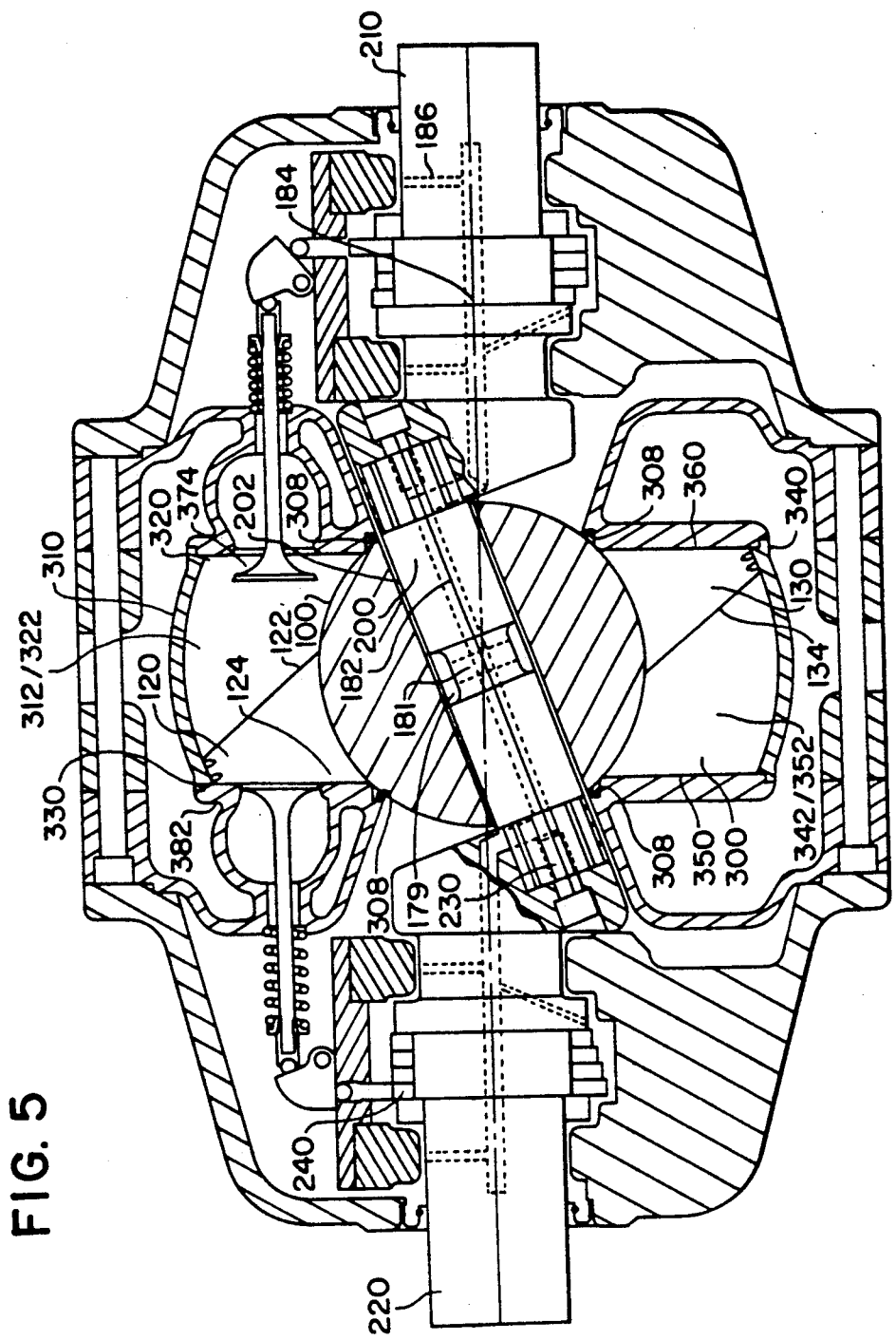
FIG. 5 is a cut away side view taken in section of the ball, shaft and disc arrangement in a chamber.

Throughout the specification, the nutating engine will be referred to in the orientation shown in FIG. 5 where the exhaust valves are positioned on the top of the engine and the drive shafts extend laterally outward from two sides of the engine. However, this orientation was arbitrarily chosen only to maintain uniformity in the description of the engine. The operational orientation of the engine is not limited to this configuration. Rather, any orientation would be within the scope of the present invention.

Figure 1B:
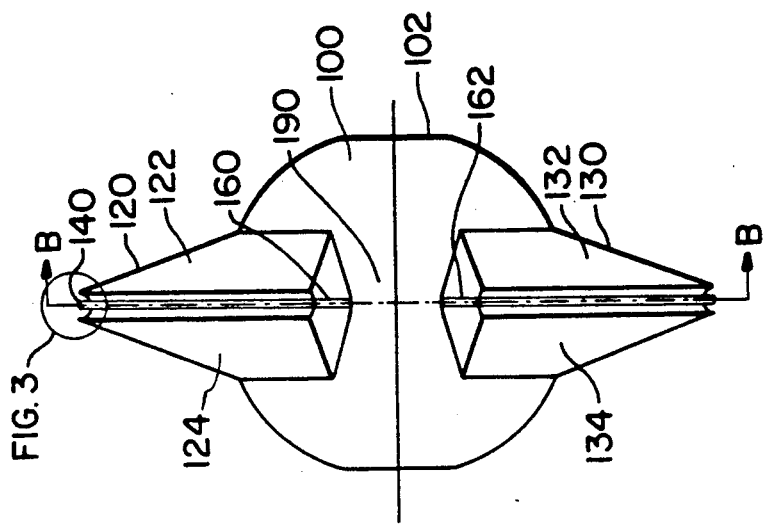
FIG. 1B is an end view of the ball and disc arrangement.
Figure 1A:
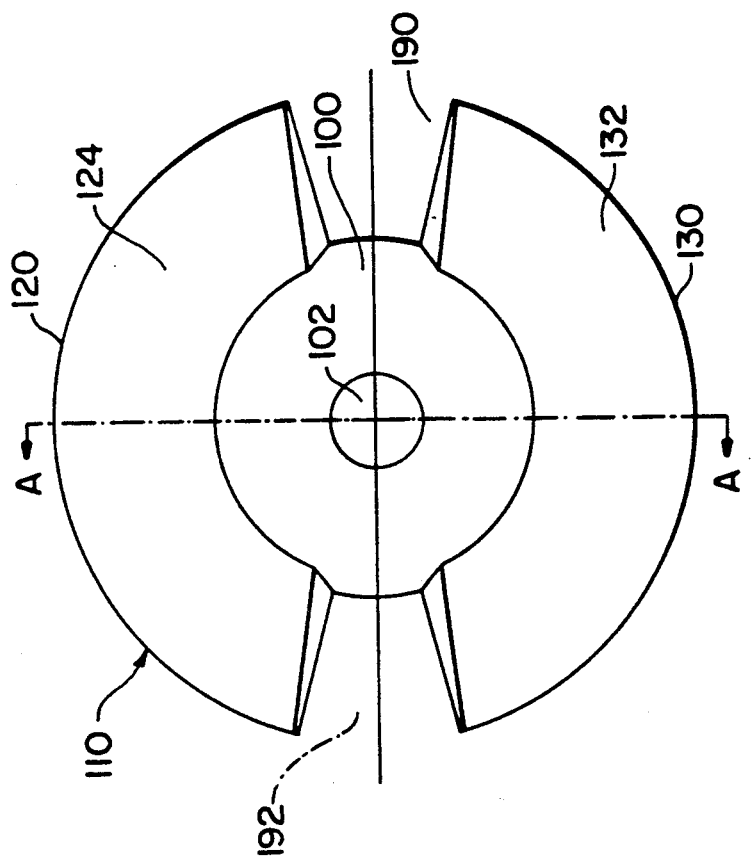
FIG. 1A is a side view of the ball and disc arrangement.

Turning first to FIG. 1A, this figure shows the ball 100 and disc 110 arrangement from the side view. The surfaces of the disc are not parallel, but are cone shaped which is apparent when disc 110 is viewed as in FIG. 1B. Gaps 190 and 192 divide the disc into the disc portions 120 and 130. These gaps 190 and 192 are positioned to receive corresponding stops 390 and 480, described later and shown in isolation in FIGS. 12 and 13. The gaps 190 and 192 in the preferred embodiment are spaced 180 degrees apart, although they could be positioned at some other angle as will be described in reference to FIG. 17. Because the ball and disc of the nutating engine are symmetrical, the center of mass of the ball and disc is stationary at all times. Also, the nutating disc internal combustion engine can operate at high revolutions per minute (RPMs) due to the stationary center of mass which minimizes the stress on the crankshaft. When the stops are not positioned 180 degrees apart, the weight distribution of the disc portions can be adjusted to have a stationary center of mass. In addition, any number of gaps could be used to define additional chambers.

Turning now to FIG. 1B, an end view of the ball and disc arrangement is shown. The ball 100 is shown with the disc portions 120 and 130 circumscribing the ball. The crank shaft 200 (shown in FIG. 5) extends through opening 102 and out of both surfaces of the ball. The crankshaft 200 is perpendicular to the plane containing the disc. Also shown is upper disc portion 120 having a first side 122 and a second side 124 and the lower disc portion 130 having the sides 132 and 134. The edges 140 of the disc portions which are apparent will be discussed in more detail in reference to FIG. 3. Finally, the upper right stop seal 160 and the lower right stop seal 162 can be seen along the inner edge of the disc extending from the ball 100 to the edge 140 of the disc.

Figure 2A:
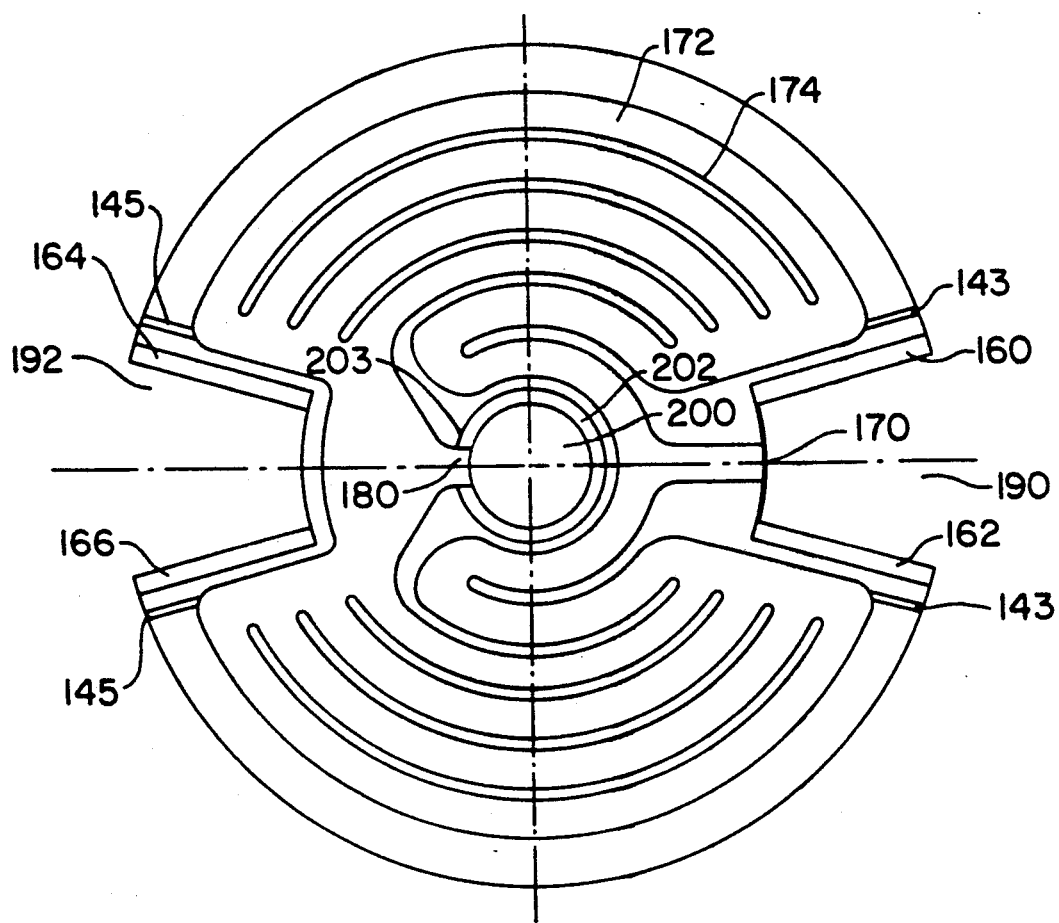
FIG. 2A is a cross-section of the disc as shown in FIG. 1B.
Figure 2B:
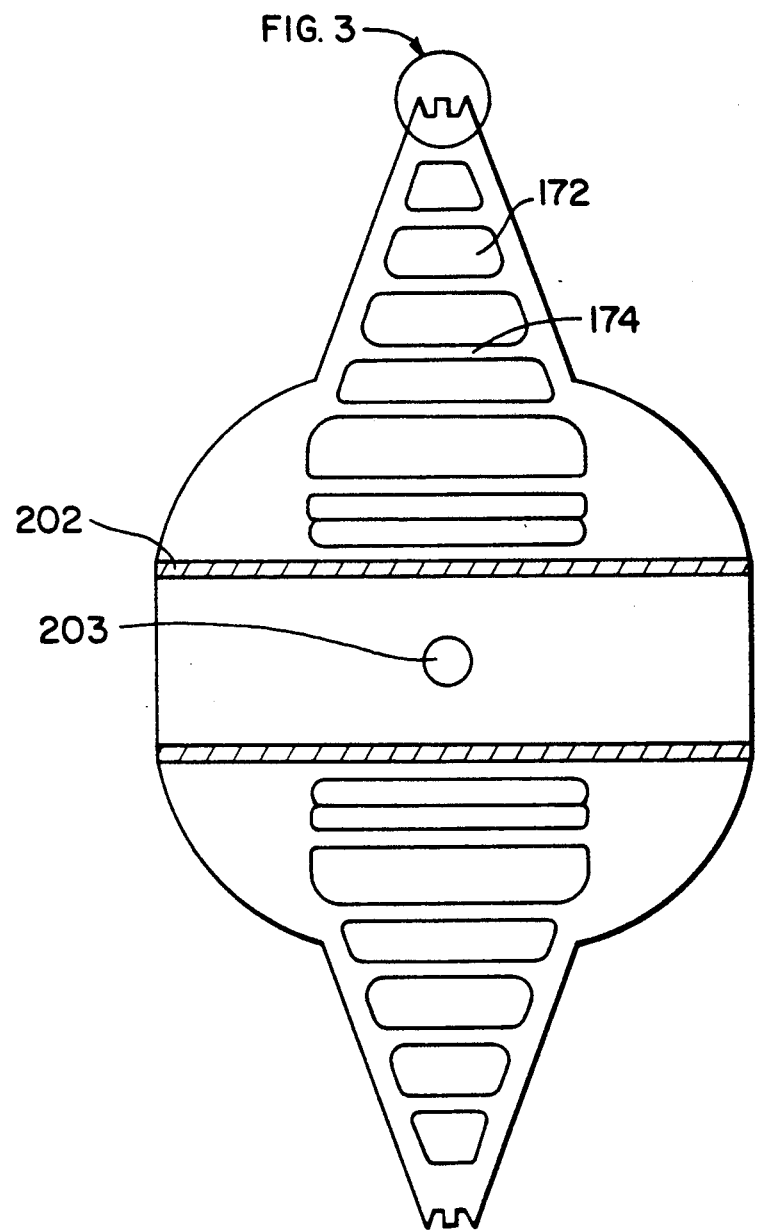
FIG. 2B is a cross-section of the disc as shown in FIG. 1A.
Figure 3:
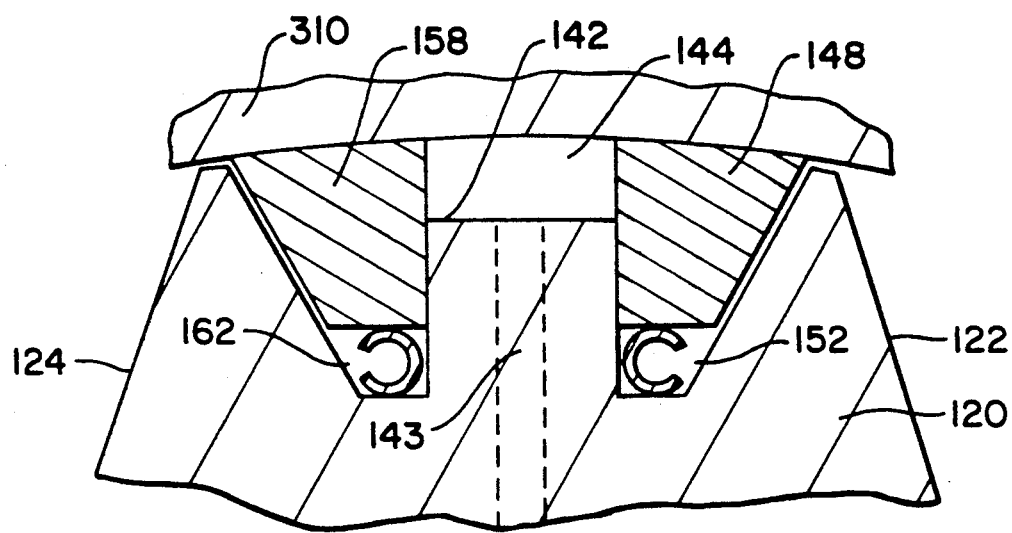
FIG. 3 is a cross-sectional view of the disc and chamber showing a sealing means of the disc.
Figure 4:
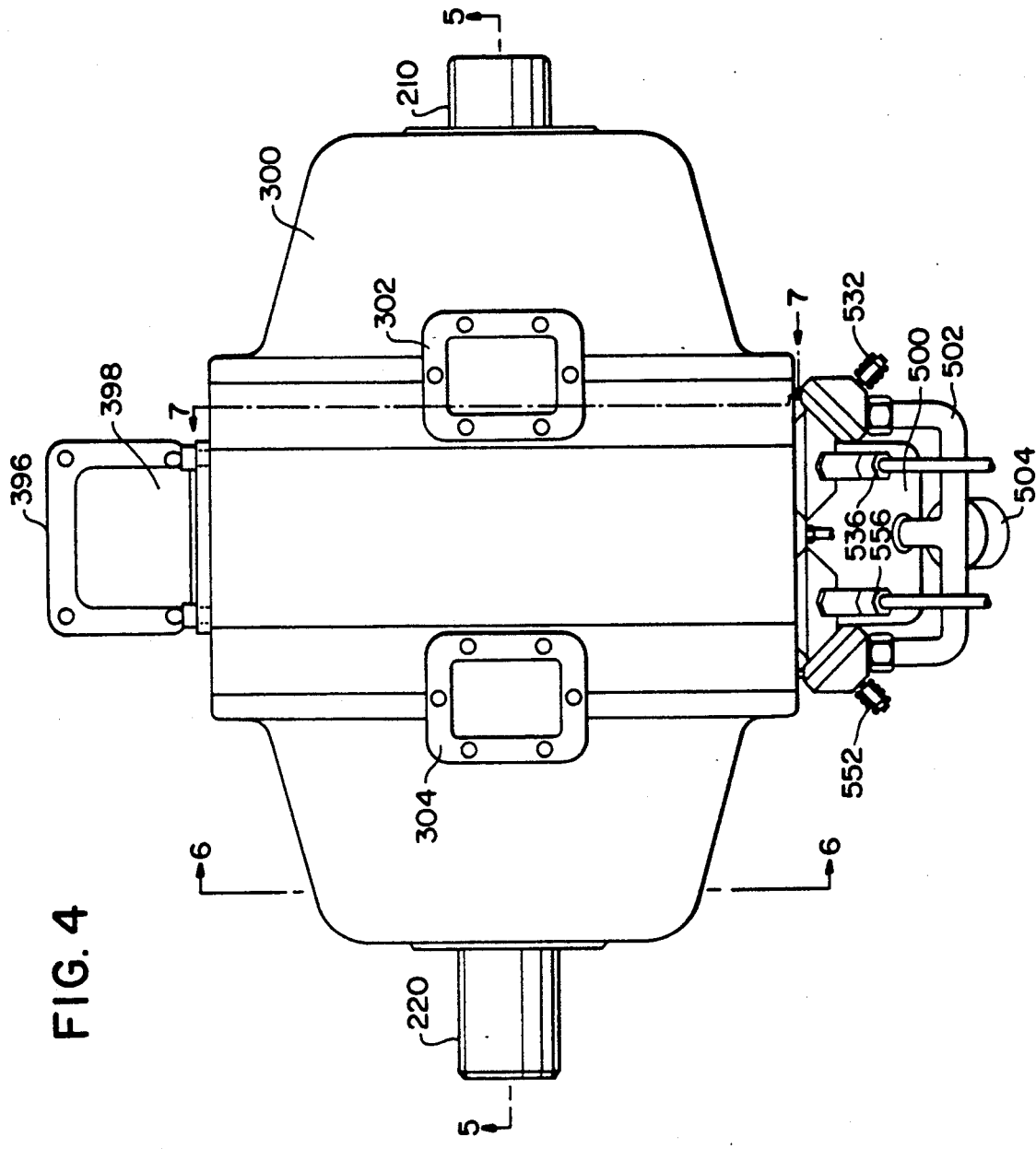
FIG. 4 is top view of the outer chamber showing the exhaust manifolds.

Turning now to FIGS. 2-13, these Figures show various cross-sections of the ball, shaft and disc as they are positioned within a chamber. FIG. 5 shows the side view corresponding to the ball and disc arrangement of FIG. 1 within the chamber. The description of the cooling and lubrication systems and the outer chamber of the engine as shown in FIGS. 2-4 will be discussed in detail in reference to FIG. 5.

Describing first the general structure of the nutating engine as shown in FIG. 5, the nutating engine includes a ball 100 circumscribed by two disc portions 120 and 130 which are enclosed in chamber 300. The disc portions are conical shaped to form a contact line with the walls of the chamber when the side of the disc is in contact with the wall of the chamber. The chamber 300 is made of a suitable material to withstand the stresses of an internal combustion engine. The ball 100 is sealed within the chamber 300 by means of two chamber ball seals 308. The seals 308, which are included to prevent the passage of any gas from the chamber (sections 322 and 352 in FIG. 5), can be seen more clearly in FIG. 11 which shows a cross-section of the chamber with the ball and disc removed. The seals 308 are circular in shape and seal the region of ball 100 which extends outside the chamber 300.

Along with the ball and disc, the chamber 300 includes two stops 390 and 480 (shown in FIG. 9 and in isolation in FIGS. 12 and 13) which fit into gaps 190 and 192 of the disc. The stops 390 and 480 also provide the air and fuel necessary for combustion in the engine.

To maintain uniformity and provide greater clarity in the following description of the structure and operation of the nutating engine, the chamber will be described in terms of an upper chamber portion 312 and a lower chamber portion 342 by the ball and the two stops which abut the ball as described in FIG. 14, which is a chart depicting the various chambers, sections and regions within the engine. The upper chamber portion will be the region enclosed by the ball and the stops on the bottom and will be bound on the sides by the walls 320 and 330 (FIG. 5) and the spherical segmented chamber 310 (FIG. 5) above the stops. The lower chamber portion will be the region enclosed by the ball and the stops on top and will be bound on the sides by the walls 350 and 360 (FIG. 5) and the spherical segmented chamber 340 below the stops.

Figures 14A, 14B:
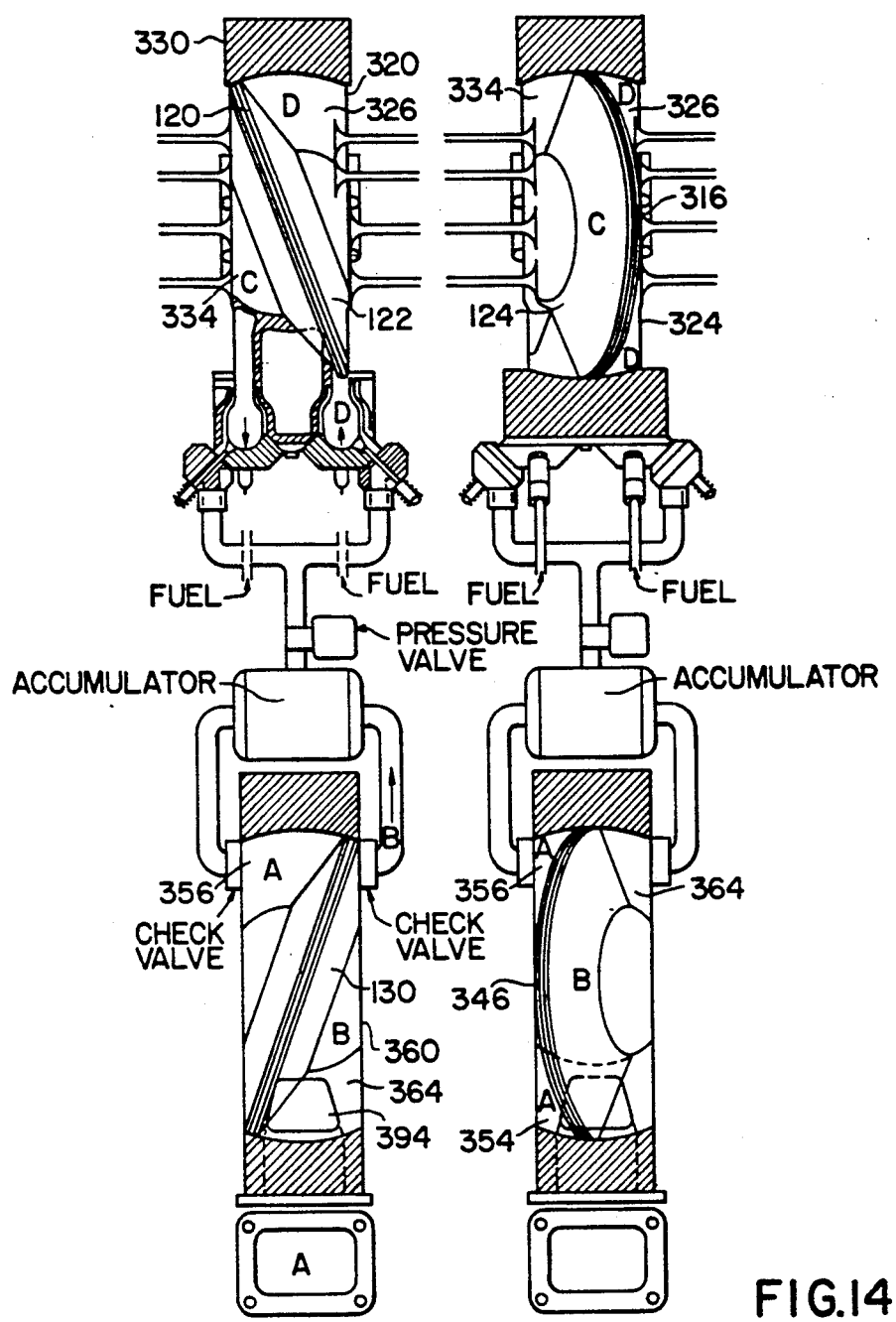
Figure 14H:
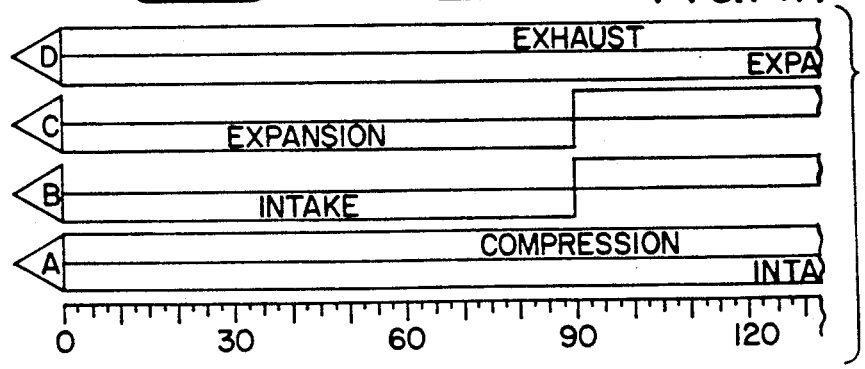

Each of the chamber portions will be further divided, as shown schematically in FIG. 14, into a left chamber section and a right chamber section. Specifically, a right chamber section 322 and a left chamber section 332 will be defined by the disc portions 120 in the upper chamber 312. Also, a right chamber section 362 and a left chamber section 352 will be defined by disc portion 130 in the lower chamber 342. Finally, each chamber section will be divided into various regions which are continuously changing, including intake, compression, combustion and exhaust regions and will be described in detail in reference to FIGS. 14a-g.

Figure 8:
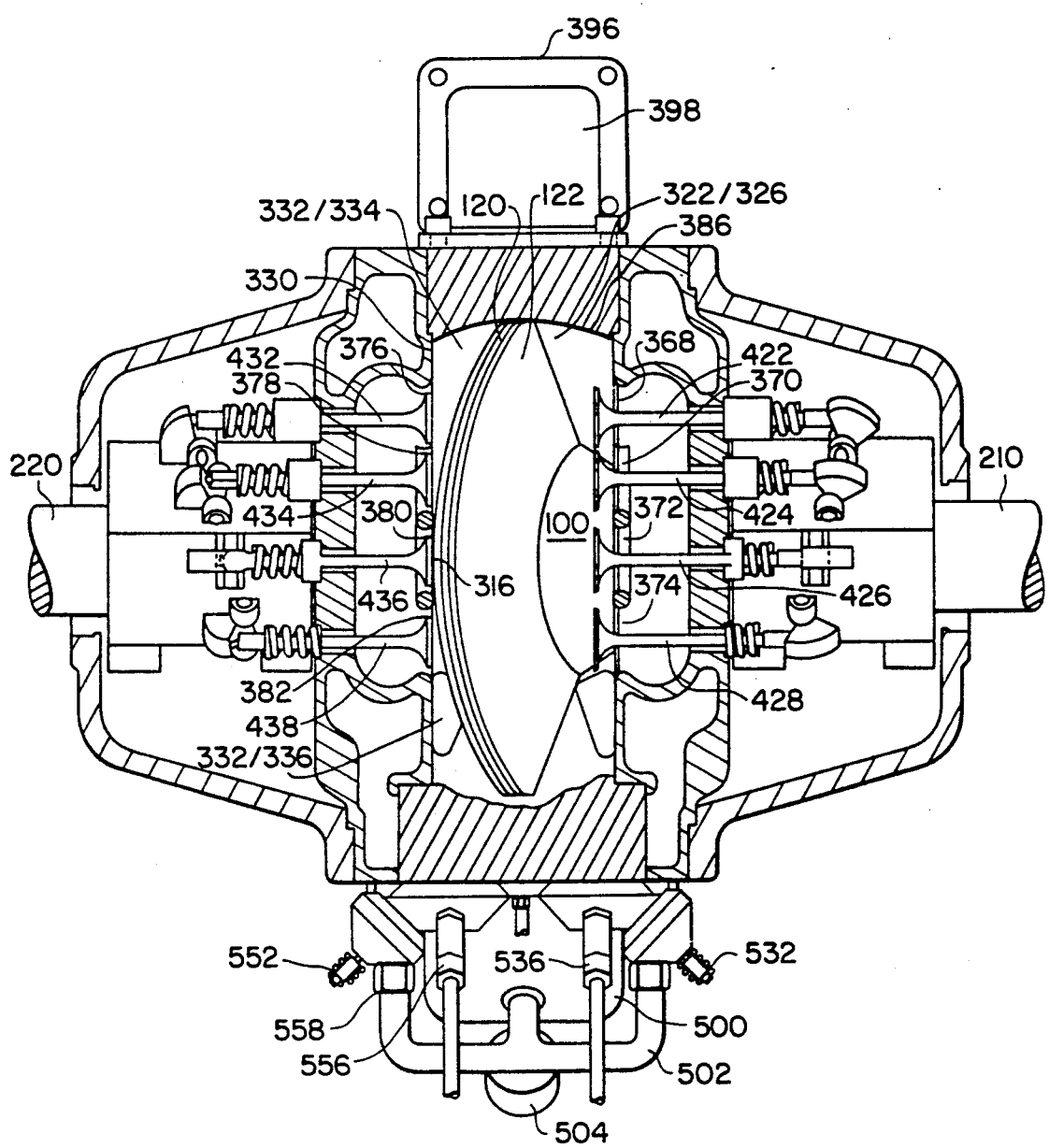
FIG. 8 is a cross-section of the nutating engine taken at lines 8—8 in FIG. 6.

Exhaust ports 368-382, shown in FIG. 8, are positioned along the side walls 320 and 330 of the upper chamber portion 312 for the two combustion/exhaust sections. The exhaust valves 422-438, also shown in FIG. 8, are positioned within the exhaust ports. Although four exhaust valves are illustrated on each of the side walls in the upper sections, any number of exhaust ports could be used. In the preferred embodiment, the exhaust valves are operated by means of cams, as is well known in the art. However, any other suitable means of opening and closing the exhaust valves could be used.

The crankshaft 200 is eccentrically affixed to the drive shafts 210 and 220 extending from both ends of the ball. In the preferred embodiment splines 230 are used to provide a rigid attachment of the crank shaft 200 to driveshafts 210 and 220 to maintain the cycles on the two sides of the disc 180 degrees out of phase. By affixing the crankshaft to the driveshafts, the arrangement of the present invention also eliminates the need for any gear linkages. Bearing 202 is positioned within the ball and extends to the drive shafts. Crank shaft 200 is rotatably positioned within bearing 202. In the preferred embodiment, the bearing is a single cylindrical bearing which is rigidly fastened to the ball 100. As shown in FIGS. 2A and 2B, bearing 202 has an opening 203 which is aligned with the disc oil outlet 180 to allow oil to pass from the disc to the crankshaft. The bearing is made of any suitable material which is known in the art.

The crankshaft 200, which is placed within the ball and bearing 202, is positioned at an angle relative to the center line of the driveshafts. While a range of angles from 10 to 70 degrees can be used in the engine, depending on power and torque requirements, the optimal crankshaft angle would be between 10 and 30 degrees. In the preferred embodiment, the crankshaft is positioned at an angle of 20 degrees. The nutating action of the ball and disc, which is achieved by the expanding gases acting on the wall of the disc portions, drives the crankshaft via a bearing 202. The motion of the crankshaft 200 is best described by envisioning a line extending from the center point of the crankshaft 200 to the outer ends. As the crankshaft pivots around the center point, the imaginary line would generate two cones, whereby the tips of the two cones are connected at the center point of the crankshaft. As the crankshaft 200 rotates, it drives the two drive shafts 210 and 220 in a rotational motion with the axis of rotation of the driveshafts being the line through the center of the driveshafts. However, it is possible to include a single driveshaft. The end of the crankshaft which is not attached to a driveshaft would rotate within the engine by means of bearings. As the ball and the conical disc nutate, the various chambers of the internal combustion engine defined by the disc and the walls of the chamber are continuously changing as will be shown in detail in FIG. 14 a-g.

Describing generally the various chambers of the nutating internal combustion engine, intake and compression cycles take place in single sections on each side of the engine in the lower chamber portion 342 of the engine. Also, combustion and exhaust cycles take place in single sections on each side of the engine in the upper chamber portion 312 of the engine. The combustion regions in each of the upper right section 322 and the upper left section 332 (shown in FIG. 8) fires every 360 degrees to allow for the firing of the internal combustion engine every 180 degrees. Depending upon the position of the disc, either two or three regions exist in the upper chamber 312 and either two or three regions exist in the lower chamber 342 as shown in FIG. 14a-g which will be described in more detail. These regions are used for the four cycles of the internal combustion engine on each side of the engine.

Specifically referring to the chambers in FIG. 5, the section next to surface 122 of disc portion 120 forms a section 322 for combustion/exhaust. The exhaust port 374 which can be seen is one of the ports which provides an outlet for the exhaust during the exhaust cycle in the upper right section 322. As the nutating body rotates throughout its full range of motion, a second upper section will become apparent in the upper chamber portion 312. Specifically, a second upper combustion region would be formed between wall 124 of disc portion 120 and the wall 330 containing exhaust port 382. This upper section on the left side would be identical to the section on the right side, and would fire 180 degrees out of phase from the right side.

Figure 10:
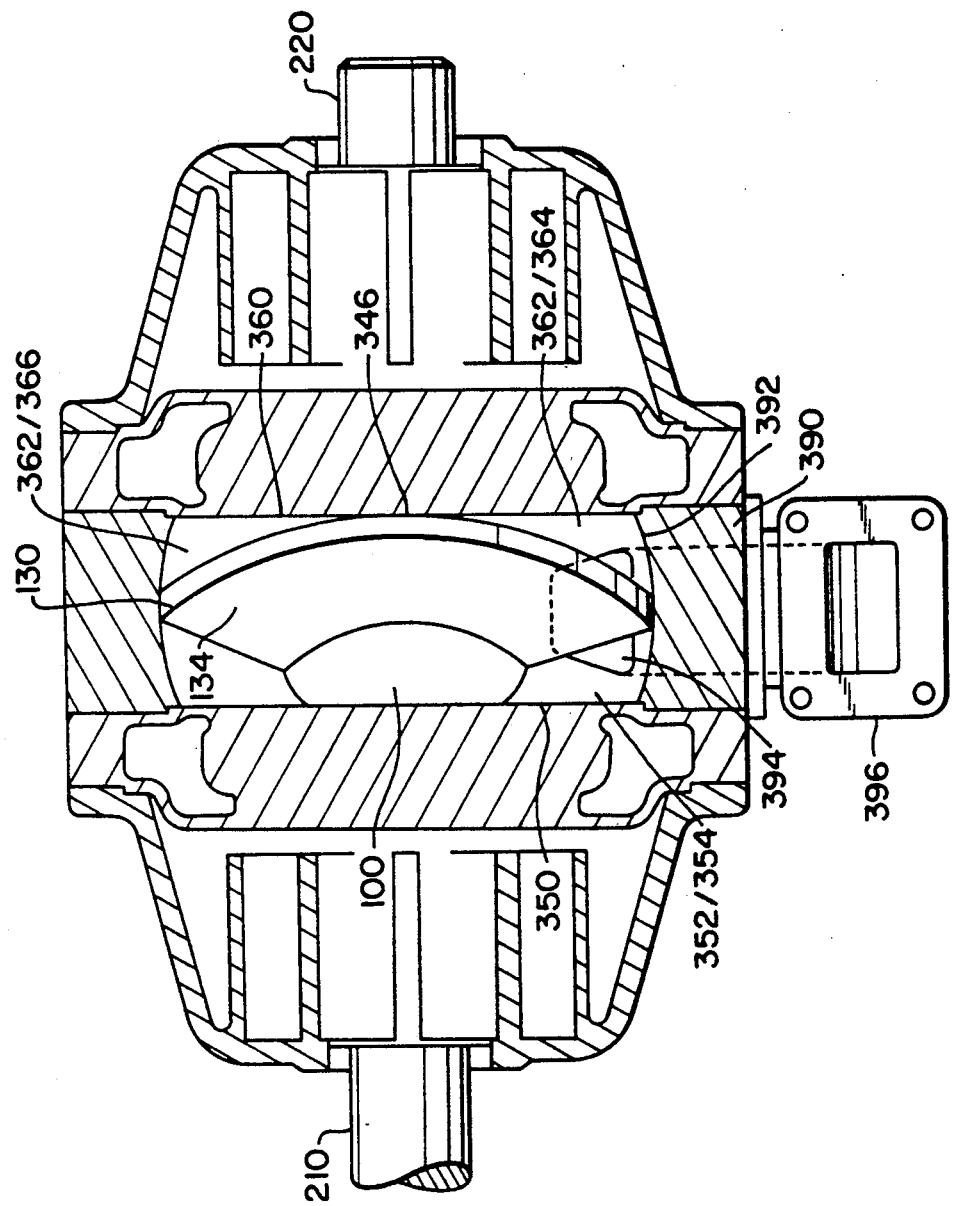
FIG. 10 is a cross-section of the nutating engine taken at lines 10—10 in FIG. 6.

The lower left section 352 shown in FIG. 5 is defined by the walls 134 of the disc 130 and the outer wall 350 of the lower chamber portion. The lower left section 352 is the input/compression section. As the nutating body rotates through its full range of motion, a second lower right section 362 (as shown in FIG. 10) will become apparent in the lower chamber portion 342. The presence of either two or three regions within the upper chamber 312 or the lower chamber 342 and the continual changing of these regions will be discussed in detail in the description of FIG. 14a-g.

Describing now the cooling system shown, FIG. 5 in conjunction with FIG. 2 show the series of fluid passages in the engine. Specifically, FIG. 2A shows the cross-section of the disc taken at line B—B in FIG. 1B. On the right side of the ball segment, disc fluid input 170 is shown. In the preferred embodiment, a fluid is driven into the ball and disc by way of the fuel injection stop 480 (shown in FIG. 13) which is positioned within the gap 190 between the disc portions. However, any other suitable position or means to inject the fluid could be employed. While any suitable fluid could be used to cool and lubricate the disc, oil is preferably used. Input 170 leads to a series of cooling channels 172 which weave around channel islands 174. The series of cooling channels converge near the left side of the ball at disc fluid outlet 180. FIG. 2B shows a cross section of the ball and disc taken at lines A—A in FIG. 1A. The cooling channels 172 and the islands 174 can be seen. Disc fluid outlet 180 is in direct communication with fluid trough 179 and allows fluid to pass to fluid outlet passage 182 by way of fluid passage 181 shown positioned within the crankshaft in FIG. 5. Fluid outlet passages 182 pass fluid to fluid outlets 184 within the driveshafts. The fluid is then cooled and recirculated to the oil input section of the fuel injection stop, by way of a suitable oil pump as is used in the art.

Figure 11:
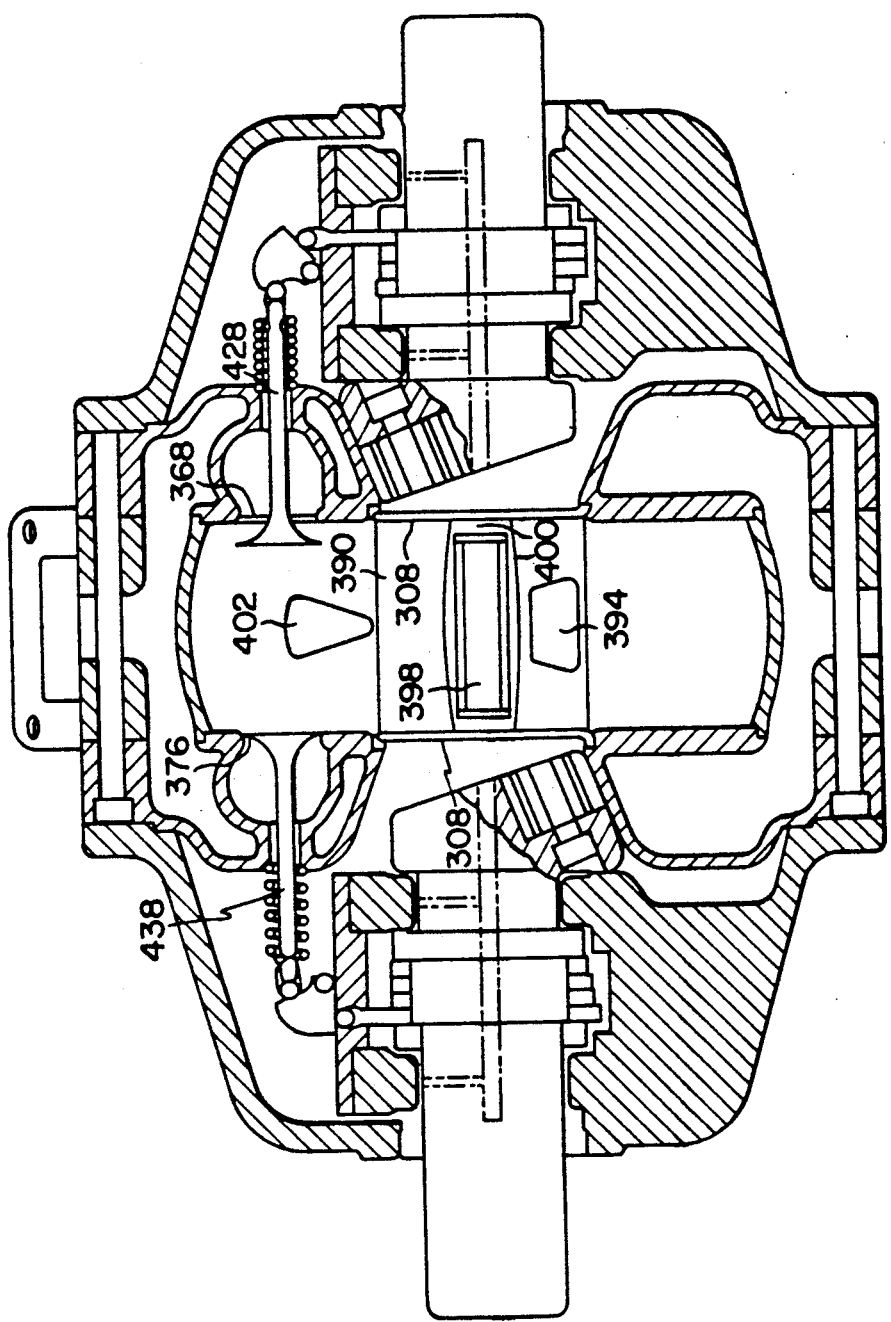
FIG. 11 is a cross-section of a nutating engine showing an alternate exhaust port.

Describing now the sealing of the ball and disc within the chamber, the nutating disc internal combustion engine includes four main sealing regions. First, the ball is sealed within the chamber by means of seals 308. Seals 308 include two ring seals which are positioned within the chamber to seal the chamber at the portion of the ball extending through the chamber. The seals can also be seen in FIG. 11 where the ball and disc have been removed. The engine includes another sealing element 400 positioned on the ends of the stops 390 and 480 which abut the ball. In FIG. 11, the seals of the air intake stop 390 is shown. The fuel input stop seals are identical to the air input stop seals.

The remaining sealing elements are positioned around the disc portions 120 and 130. These seals a used to prevent the passage of gas from any of the sections or regions within the upper and lower chamber portions. Shown in FIG. 2A are the stop seals 160-166 positioned along the edge of the disc which will come in contact with the stops which will be described later. Also, FIG. 3 shows a cross section of the conical disc including a pair of seals 148 and 158 which are positioned between the edge of the disc and the spherical segmented surface of the chamber. These seals include two C rings 152 and 162 which provide pressure on the sealing elements to keep fluid between the sealing elements of the outer edge of the disc and the spherical wall of the chamber. Fluid from the disc is transferred to the trough 144 from the cooling channels 172 within the disc by means of the passage 143 and is returned by means of passage 145. This fluid provides lubrication and cooling of the seals.

The sealing arrangement including seals 148 and 158 works on the principle that if the disc portion 120 is moving to the right along the wall 310, a region of high pressure on the wall 124 will also act on seal 158 to force the seal 158 to the right, against wall 142. Similarly, an area of relatively high pressure as well as the movement of the disc to the right along wall 122 forces the seal 148 to the left. As a result, the unique seal arrangement maintains the fluid in the fluid trough 144 for adequate sealing and lubrication.

Turning now to FIG. 4, this figure shows the outside chamber of the nutating internal combustion engine. Shown on the top of the engine are exhaust manifolds 302 and 304. Air intake 396 leading to air shaft 398 is also shown. The fuel injection section is shown generally on the opposite side of the engine. Specifically, the fuel injection system, which will be discussed in more detail later, includes an accumulator 500 having an accumulator passage 502 leading to both sides of the engine. The accumulator passage 502 leads to a right air injector 532 and a left air injector 552 which inject compressed air from the accumulator into the prechambers 484 and 494 (shown in FIG. 9). In addition, the nutating engine includes a right fuel injector 536 and a left fuel injector 556. The drive shafts 210 and 220 can be seen extending from the two sides of the engine.

Figure 6:
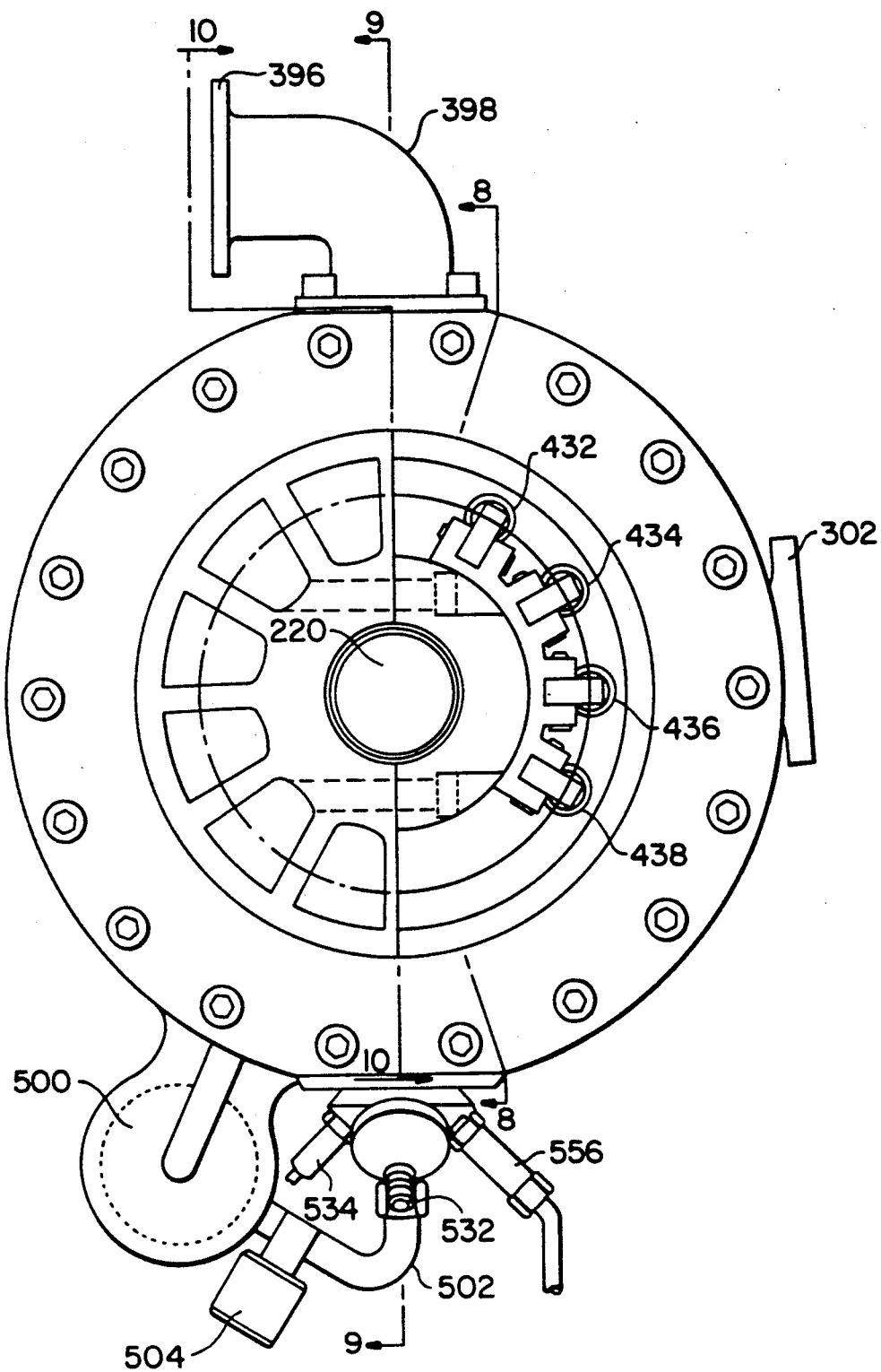
FIG. 6 is a cross-section of the nutating engine taken at lines 6—6 in FIG. 4.
Figure 7:
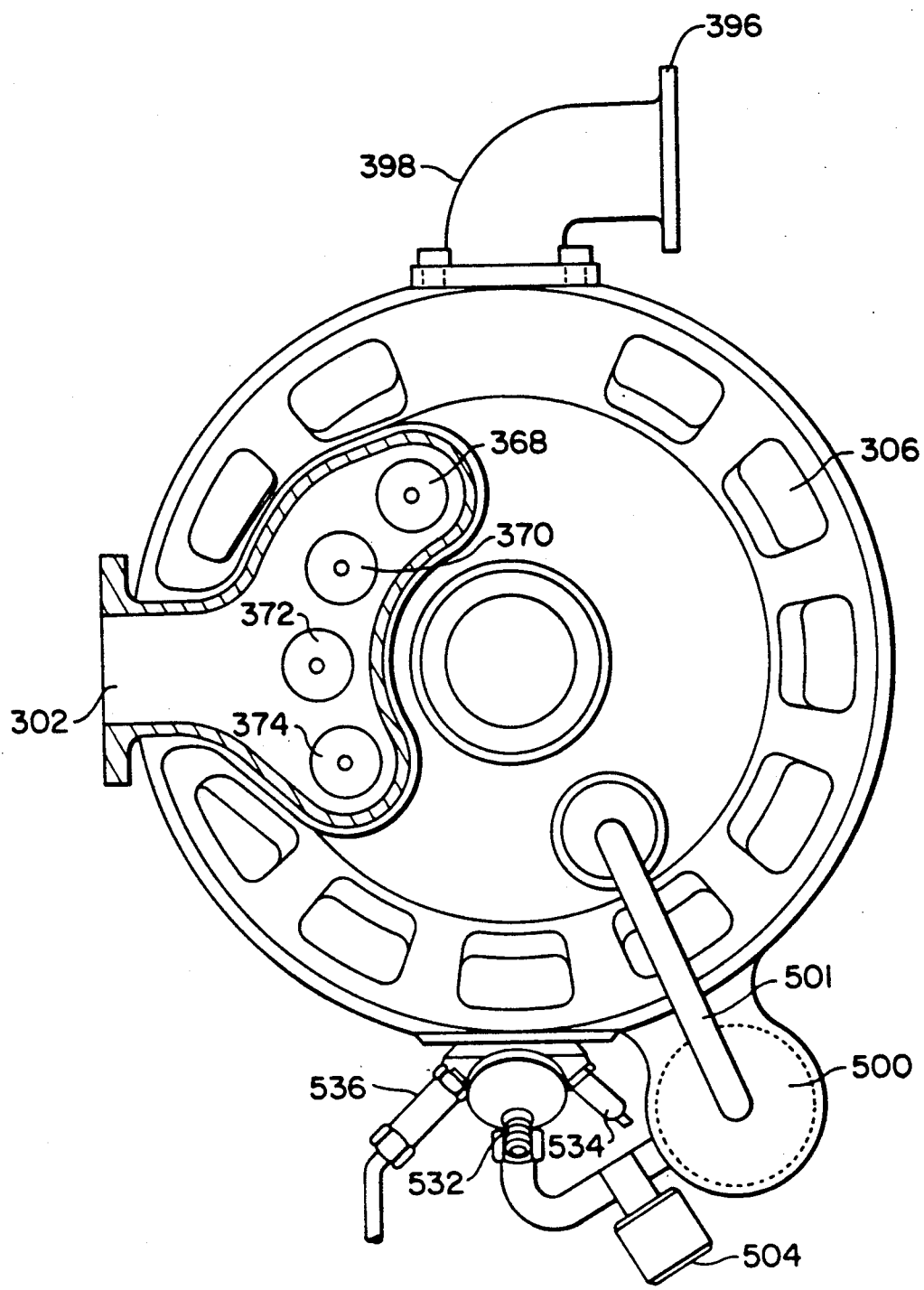
FIG. 7 is a cross-section of the nutating engine taken at lines 7—7 in FIG. 4.

Turning now to FIG. 6, FIG. 6 is a cross section of FIG. 4 taken at lines 6—6. Air intake 396 having air passageway 398 is shown generally at the top of the figure. Air enters through the air intake and travels in a counter-clockwise direction through chambers within the engine. The flow of the air in the engine will be more thoroughly described in reference to FIG. 14a-g. The compressed air is received by the accumulator 500 by way of accumulator supply passage 501 (as shown in FIG. 7) and travels through the accumulator passage 502, which passes through the pressure valve 504. As will be discussed in more detail later, fuel is injected from the fuel injector 556 and combined with the charge of air from the accumulator in the prechamber. The charge of air and fuel is ignited by the spark plug 554 in the pre-chamber. Combustion and exhaust generally occur in the right half of the chamber where the valves 432-438 are shown generally.

Turning now to FIG. 7, which is a cross section of FIG. 4 taken at lines 7—7, FIG. 7 shows air intake 396 having air passageway 398 generally near the top of the engine. Air travels clockwise through the intake and compression sections to the accumulator supply passage 501 which feeds air from the intake and compression sections into the accumulator 500. Generally the compressed air from the accumulator is combined with fuel in the prechamber. The fuel injection system supplies the fuel charge to the combustion sections which are generally on the left side of the engine as shown. Exhaust valves 368-374 and exhaust outlet 302 are also shown in this cross-section.

FIG. 7 also shows the air transfer system of the Nutating Engine. Compressed air from the compression chamber on either section of the lower right chamber portion is transferred by way of the accumulator supply passages 501 from the lower right section on each side of the disc to the accumulator 500. Each side of the disc supplies a compressed air volume into the accumulator every 360 degrees of crankshaft rotation. Because each side is 180 degrees out of phase, the accumulator receives one charge every 180 degrees of crankshaft rotation. The compressed air volume is stored in the accumulator 500 at a predetermined pressure which depends on the desired compression ratio of the engine. While the accumulator can be of a size to contain any number of charges from the engine, it is preferred that the accumulator contain a sufficient number of charges to minimize pressure fluctuations within the accumulator as charged air is transferred from the compression regions to the accumulator and from the accumulator to the combustion regions.

During the initial start-up, a variable pressure valve 504 is located between the accumulator 500 and the air injector valve 532. The pressure valve remains closed to allow the accumulator to reach its operating pressure. When the operating pressure is reached, the variable pressure valve 504 opens to allow the compressed air to flow to the air injector valve. The air injector valve can be operated mechanically by way of a cam or any other suitable mechanism. Preferably, a solenoid operated by an electronic controller is used. When the air injector valve is opened, a charge of air is delivered into the stop pre-chamber. As will be discussed in greater detail in FIGS. 14a-g and 15, when the combustion chamber begins to expand, the compressed air charge enters the pre-chamber and the expanding combustion chamber. During this interval, the fuel requirement is also injected. When the combined pre-chamber volume and the combustion chamber volume are equal to the injected air charge, the air injector valve closes. Ignition takes place to initiate combustion.

Turning now to FIG. 8, the top view of the nutating engine is shown. From this view point, only the disc portion 120 can be seen. The position of the disc portion 120 in this Figure shows that the disc portion 120 divides the upper chamber into three regions. Specifically, a left section 332, which is split into region 334 and region 336, is defined. Similarly, a right section 322 is shown as region 326. The contact line 316 of the upper surface 122 is shown in line with exhaust port 380.

As the ball 100 and disc portion 120 nutate, the contact line 316 changes its position so as to define the chamber volumes for the various regions. At a specific point when contact line 316 reaches either edge of the stop, only two regions are defined in the upper chamber (as shown in FIG. 14a). Specifically, region 322 is shown on the right side of the upper chamber 312 and region 332 is shown on the left side of the upper chamber 312, where the disc portion 120 forms a diagonal across the upper chamber 312. As the ball and disc continue to move in a nutating manner, the contact line 316 will then move along wall 330, thereby forming two regions on the side of the chamber having a contact line and one region on the side of the chamber not having a contact line.

Because both the intake and compression regions are combined into a single section and the combustion and exhaust regions are combined into a single section on one side of the engine, in the preferred embodiment a single nutating internal combustion engine includes two combustion regions. Each of the combustion regions shown in FIG. 8 fires every 360 degrees to allow the nutating internal combustion engine as a whole to fire every 180 degrees.

In addition, the present invention also shares volumes between the chambers on the left section and the right section of the nutating engine by operating the two sides 180 degrees out of phase. Specifically, the upper left region 332 includes a combustion stage in region 336 and a final exhaust mode in region 334, both occupying a small volume in the upper chamber portion 312. At the same time, the upper right region 322 is in the initial exhaust mode, occupying a large volume of the upper chamber portion 312. As a result of the shared chambers whereby the two sides fire 180 degrees apart, the size and weight of the nutating internal combustion engine is greatly reduced while the efficiency is greatly increased.

Also shown in FIG. 8 are the exhaust ports for the upper chamber. Specifically, the right chamber shows the exhaust ports positioned along wall 320. These exhaust ports are in an open position. The exhaust ports positioned along the left wall 330 are all closed. The valves all open simultaneously for exhaust, but close in sequence just ahead of the contact line. In the preferred embodiment, the valves operate via cams 240 attached to the drive shafts. Due to the unique configuration of the nutating engine, walls 320 and 330 provide a substantially greater area which is available for exhaust valving. Specifically, because the nutating internal combustion engine operates with chambers that vary in size as the ball and disc move in a nutating manner, a large surface area can be used for the exhaust ports. This feature reduces pumping losses compared to the average piston engine.

In addition, the nutating engine improves combustion chamber characteristics by providing a spherically triangular open combustion chamber which is not restrictive to the flame front compared to the long and narrow chamber of the rotary Wankel engine. Also, the line defined by the physical contact of the conical disc with the flat chamber plate exhibits relative slippage. This is beneficial because of the cleaning nature of this motion. Specifically, the advantage of the motion provides a cleaning action for any deposited material that would form on the surfaces during combustion and exhaust.

Figure 9:
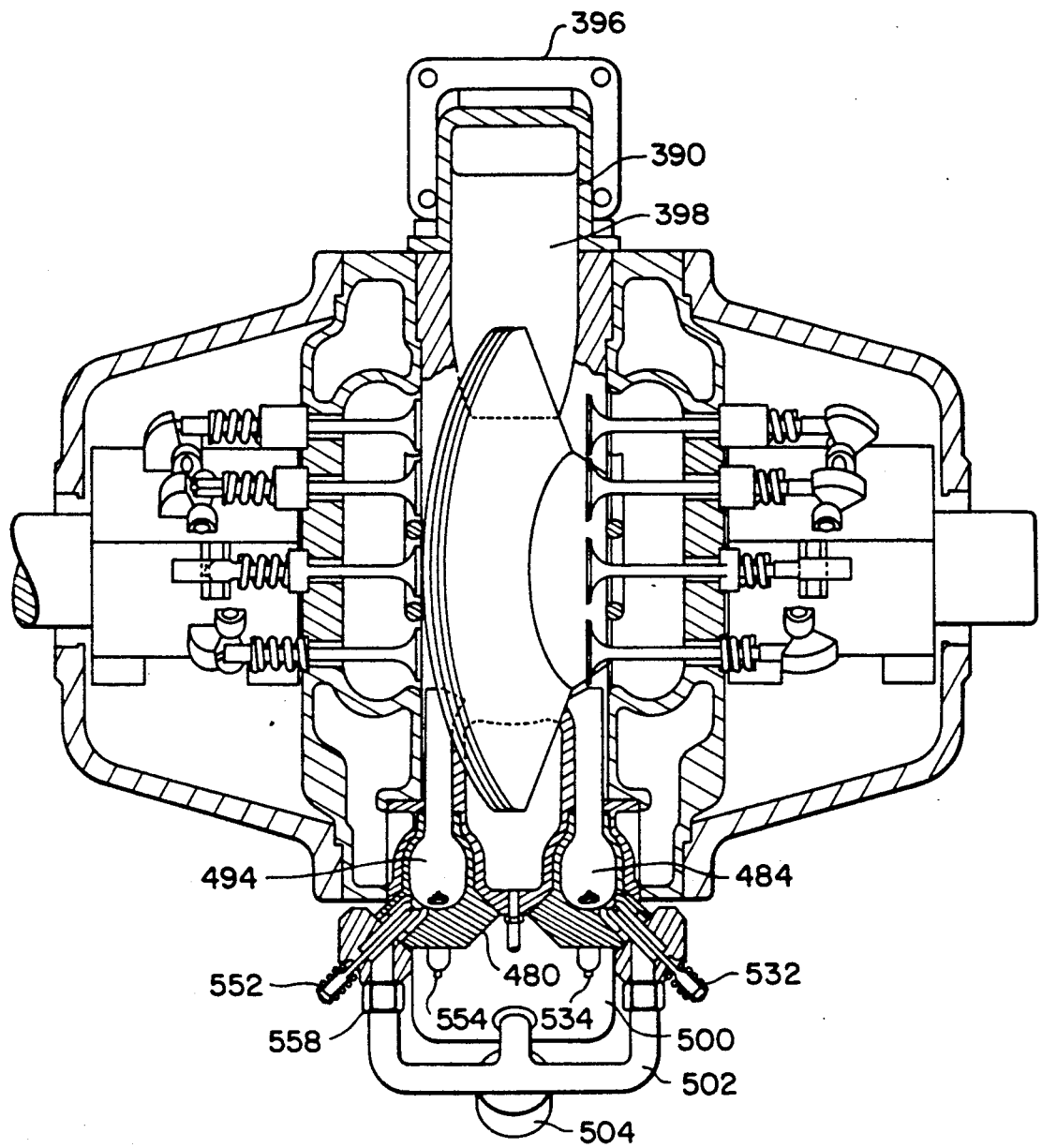
FIG. 9 is a cross-section of the nutating engine taken at lines 9—9 in FIG. 6.

Turning now to FIG. 9, FIG. 9 shows the cross section and nutating engine showing the unique fuel injection system. Fuel injection system includes fuel injection stop 480, accumulator 500, accumulator supply passage 501 (shown in FIG. 7), accumulator outlet passage 502, pressure valve 504, fuel injectors 536 and 556 (shown in FIG. 8), air injector valves 532 and 552 and spark plugs 534 and 554. Specifically, the fuel injection system includes an accumulator 500 which stores compressed air from the engine. Describing the right side of the fuel injection system in the preferred embodiment, a cam operated air injector valve 532 allows air to be released into the pre-chamber 484. However, any means of allowing the air into the pre-chamber could be used, including hydraulic valves. Referring to the right combustion chamber, fuel is added to the prechamber by way of a fuel injector 536, shown in FIG. 8. At the same time, the air injector valve opens allowing the air-fuel mixture to enter the pre-chamber. The charge is then ignited by spark plug 534. The timing of the injection of the air and fuel will be discussed in detail in reference to FIG. 16A.

Turning now to FIG. 10, FIG. 10 shows the bottom view of the nutating engine, including lower right section 362 and lower left section 352. The nutating disc internal combustion engine preferably includes two stops, although additional stops could be used. Also shown in FIG. 10 is the air intake in the stop 390 which includes the intake region port 394 and air passage 396. The air intake stop 390 selectively feeds air to both sides of the engine depending on the position of the disc as it moves across the intake port in a nutating manner. The nutating internal combustion engine contains no mechanical valving elements for the intake cycle. The chamber stop side surfaces in contact with the lower edge of the disc portion 130 also may be specifically shaped or contoured so as to minimize the stop seal azimuthal travel which would be substantial if the chamber stop sides where to be planar.

Specifically, disc portion 130 and ball 100 are shown in FIG. 10 in which the contact line 346 is positioned approximately in the middle of the chamber along wall 360. The disc portion 130 defines the regions in the lower chamber which are the intake and compression regions. Specifically, lower left section 352 which is shown on the left side of the chamber defines the intake region which provides compressed air to the accumulator 500 (FIG. 4). Lower right section 362 which is shown on the right side is defined by intake region 364 and compression region 366 as a result of the contact line 346 on the wall surface 360. After the air is compressed in the compression cycle, the compressed air is transferred to the accumulator and then released to the prechamber, which will be discussed in more detail in reference to FIG. 14.

Turning now to FIG. 11, FIG. 11 shows an alternate embodiment of the exhaust system. Specifically, through minor modifications as shown in FIG. 11, some of the exhaust valves can be replaced by a single port 402 or multiple ports on the spherical surface of the chamber. The location of the port 402 would be adjacent to the stop interface with the housing. Specifically, FIG. 11 is shown with the ball and disc arrangement removed. The single exhaust port is shown above the location of the stop. Therefore, a single port would be common to both exhaust chambers. In the preferred embodiment, a single exhaust port 368 and 376 would remain along the side wall to exhaust any residual gas remaining within the exhaust chamber after the disc passes over the exhaust port. The general shape of the port would be a spherical triangular shape incorporated in the spherical surface to take advantage of the geometries formed by the nutating movement of the disc across the spherical housing. The size would be such as to maximize the combustion cycle and to not impede the exhaust cycle efficiency. Also apparent in FIG. 11 are the seals 308 which seal the ball and chamber and the air stop seals 400 which seal the air stop against the ball. A similar seal means is employed on the fuel injection stop to seal the fuel injection stop against the ball.

Figure 12:
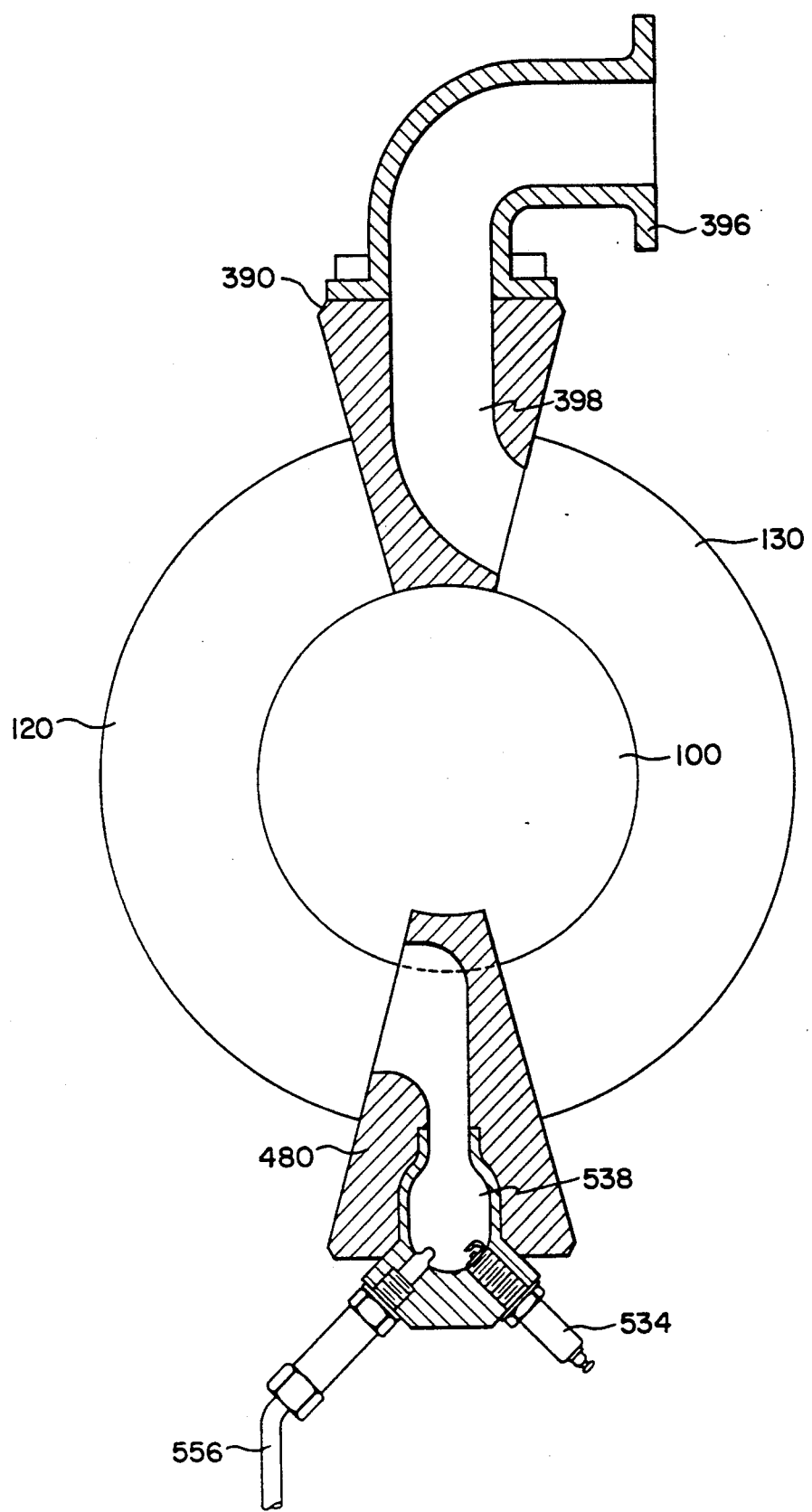
FIG. 12 shows the air inlet and fuel injection stops in isolation as shown in FIG. 6.
Figure 13:
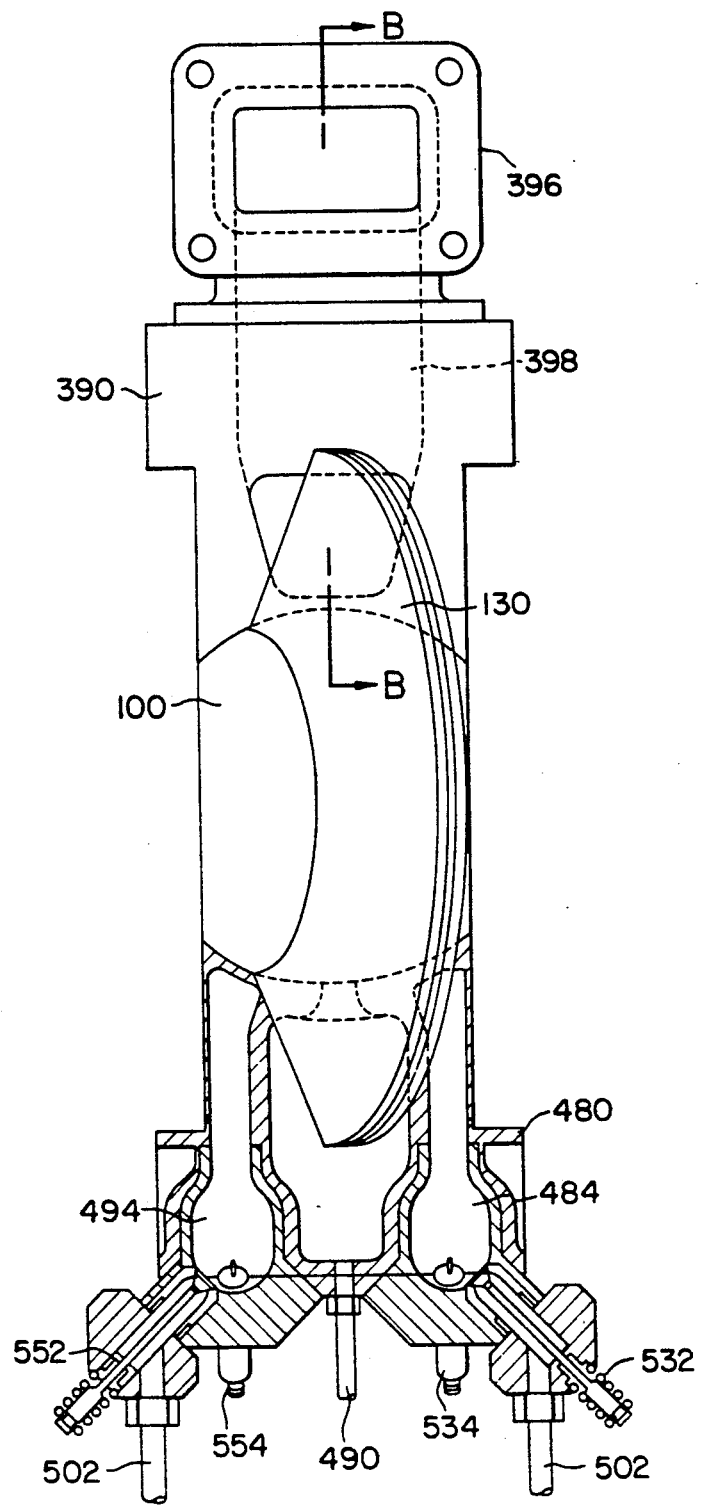
FIG. 13 shows the air inlet and fuel injection stops in isolation as shown in FIG. 9.

Turning now to FIG. 12 and 13, these figures show the two stops in isolation from different cross sectional views. FIG. 12 shows generally the air intake 396 of air intake stop 390 which allows air into the air passage 398. The air in the air shaft is advanced and enters the air chamber through the air intake port in the engine. The fuel injection stop 480 is also shown in FIG. 12 and has been described in FIG. 9. The stops in FIG. 12 are shown positioned within the gaps in the ball and disc. Also shown in FIG. 13 is the fuel injection section which shows the cross section of the fuel injection apparatus which was described in FIG. 9.

Having now seen the nutating engine from various sectional views, the orientation and interaction of the various chambers will become apparent in the description of FIG. 14a-g. Referring to the chart in FIG. 14 describing the various chambers, sections and regions, the lower left section 352 and upper left section 332 form one half of the engine where each of the four cycles occurs. In addition, the lower right section 362 and the upper right section 322 form the other half of the engine where each of the four cycles also occur. Therefore, the operation of a single nutating disc internal combustion engine in the present application is equivalent to a two rotor Wankel rotary engine or to a four cycle, four cylinder piston engine in terms of firing frequency. However, the nutating disc internal combustion engine is greatly reduced in size and weight and only requires two ignition plugs versus four ignition plugs in a comparable four cylinder piston engine.

Turning now to FIGS. 14a-g described in conjunction with the chart showing the various chambers, sections and regions in FIG. 14, FIGS. 14a-g show the sequential operation of the nutating engine. FIGS. 14a-g show the position of the disc in both the upper chamber portion 312 and lower chamber portion 342 at simultaneous times as the crankshaft rotates through various crankshaft angles. Specifically, the top half of FIGS. 14a-g corresponds to the upper chamber portion 312 while the bottom half corresponds to the lower chamber portion 342 as the crankshaft rotates through a total of 540 degrees at 90 degree intervals. Each cycle (i.e. intake, compression, combustion and exhaust) lasts 270 degrees. Also the geometry allows the engine to fire every 180 degrees. The full 540 degrees of rotation is shown because full combustion and exhaust cycles in both the upper right section 322 and the upper left section 332 can be seen and a full intake and compression cycle in both the lower right half chamber 362 and the lower left half chamber 352 can also be seen. However, as is apparent, a cycle of the nutating disc repeats every 360 degrees, whereby 540 degrees of rotation is merely shown for convenience. The legend along the bottom of FIG. 14a-g shows the stages of the various regions.

The motion of the upper chamber also works in conjunction with the lower chamber so that the intake and compression in one lower chamber provides the compressed air for the power and exhaust strokes in the upper chamber. Specifically, FIG. 14a shows upper portion 120 positioned diagonally across the upper chamber portion 312 and the crankshaft position is arbitrarily defined at 0 degrees, defining an upper right section 322 and an upper left section 332. At the 0 degree crankshaft position, the upper right chamber 322 contains an upper right exhaust region 326 and the upper left chamber 332 contains an upper left power region 334.

FIG. 14a shows lower disc portion 130 positioned diagonally across the lower chamber portion 342 and the crankshaft position is at 0 degrees, defining a lower right section 362 and a lower left half chamber 352. At the 0 degree crankshaft position, the lower right section 362 contains a lower right half intake region 364 and the lower left section 352 contains a lower left hand compression region 356.

As the crankshaft rotates 90 degrees, the upper disc portion 120 moves to the position shown in FIG. 14b. At this time, the edge of the disc 122 forms a contact line 316 with the upper chamber right side wall 320. The contact line 316 forms an upper right power region 324 and an upper right exhaust region 326. The contact line 316 moves the disc to define chambers which are continuously changing in volume. In the upper left section 332, only a single upper left power region 334 exists. The power stroke is just ending in the power region 334 as it reaches its maximum volume and the exhaust phase is about to begin.

At the same time, the lower disc portion 130 moves to the position shown in FIG. 14b. The edge of the disc 130 forms a contact line 346 with the lower chamber left side wall 350. The contact line 346 forms a lower left half intake region 354 and a lower left half compression region 356. As the contact line 346 moves, the lower disc portion 130 defines chambers which are continuously changing. The compressed air is being fed into the accumulator and will be released into the upper chamber during the combustion phase (in FIG. 14(C)) prior to ignition. The timing of firing in the combustion chamber will be discussed in detail in reference to FIG. 15. In the lower right chamber section 362, only a single lower right intake region 364 exists. The intake stroke is just ending in the lower right region 364 as it reaches its maximum volume and the compression phase is about to begin.

As the crankshaft rotates another 90 degrees (for a total of 180 degrees) as shown in FIG. 14c, the disc portion 120 is again positioned at a diagonal across the upper chamber portion, defining only two chambers. Specifically, the upper right exhaust region 326 has disappeared and the upper right power region 324 has become larger as the power cycle on the right side continues. In the upper left section, only an upper left exhaust region 336 exists. The exhaust region 336 has become smaller as the left chamber section continues to exhaust. Note that the valves positioned on upper chamber left side wall 330 begin to close in sequence ahead of the contact line 316 as disc portion 120 continues to nutate.

At this point, the lower disc is again positioned at a diagonal across the lower chamber, defining only two chambers. Specifically, the lower right intake region 364 has disappeared and the lower right compression region 366 is becoming smaller as the compression cycle on the right side continues. In the lower left chamber, only lower left intake region 354 exists. The region has become larger as the left chamber section continues to intake air as the lower disc passes over the air intake port 394.

As the crankshaft reaches 270 degrees of rotation as shown in FIG. 14d, the upper right section 322 is still only a single upper right power region 324 at the end of the power stroke. At this point the valves have just opened and the exhaust stroke in the upper right chamber is about to begin. In the upper left section, a contact line 316 is now formed along the upper left side wall 330. The contact point 316 defines the upper left power region 334, which is just beginning to form during the power stroke in the upper left chamber 332. As the power stroke begins and the upper left power region 334 begins to expand, the upper left exhaust region 336 becomes smaller as the exhaust phase is ending. The valves are beginning to close in sequence as the exhaust phase is ending.

At 270 degrees of rotation, the lower left section 352 is still only a single lower left intake region 354 at the end of the intake stroke. At this point the compression stroke in the lower chamber is about to begin. In the lower right section, a contact line 346 is now formed along the lower right side wall 360. The contact line 346 defines the lower right intake region 364, which is just beginning to form during the intake stroke in the lower right section 362. As the intake and compression strokes continue the lower right intake region 364 becomes larger as the intake in the lower right region continues and the lower right compression region 366 becomes smaller as the compression phase is ending. The compressed gas is fed into the accumulator and will be released in the upper chamber during the combustion phase prior to ignition.

As the rotation of the crankshaft reaches a 360/0 degrees position shown in FIG. 14e, the upper disc portion 120 is now positioned at a diagonal and is in the same position as at 0 degrees. At this point a full power cycle on the right side is complete. Similarly, the lower disc portion 130 is now positioned at a diagonal and is in the same position as at 0 degrees. At this point a full intake cycle on the left side is complete. FIG. 14f and 14g show the nutating engine at a crankshaft angle of rotation 450 degrees and 540 degrees respectively. These Figures are included for convenience to show a full power cycle and a full exhaust cycle in each of the upper sections and a full intake cycle and a full compression cycle in each of the lower sections.

One significant benefit of the nutating engine is the overlap of the power strokes. The overlap of the power strokes can be seen in FIG. 14c and 14d. In FIG. 14c, the upper left half power region 334 is just beginning to form and the upper right hand power region 324 already exists. In FIG. 14d, the upper left half power region 334 already exists and the upper right hand power region 324 is just about to end as the entire chamber is about to become the upper left hand exhaust region 336. This power overlap can vary depending upon the positions of the stops, which will be discussed latter.

Figure 15A:
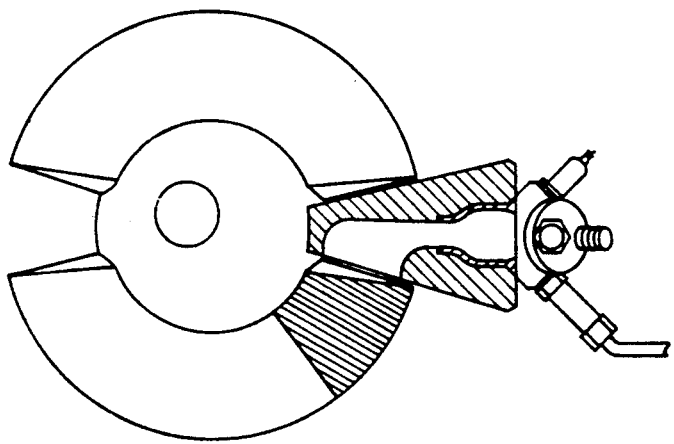
FIGS. 15a–c show different volumes for combustion and a block diagram of an electronic controller which changes the compression ratio.
Figure 15B:
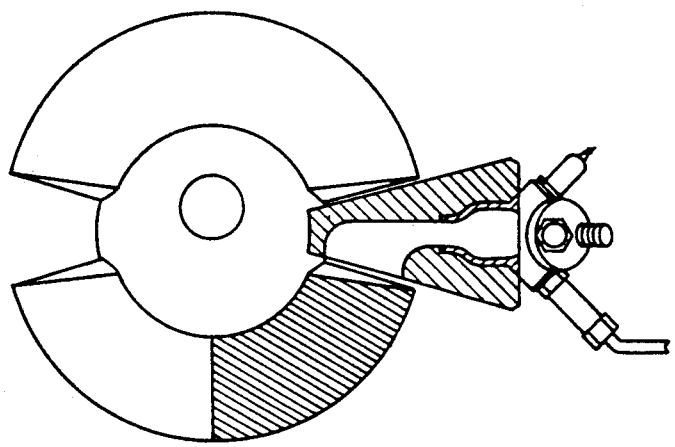
Figure 15C:
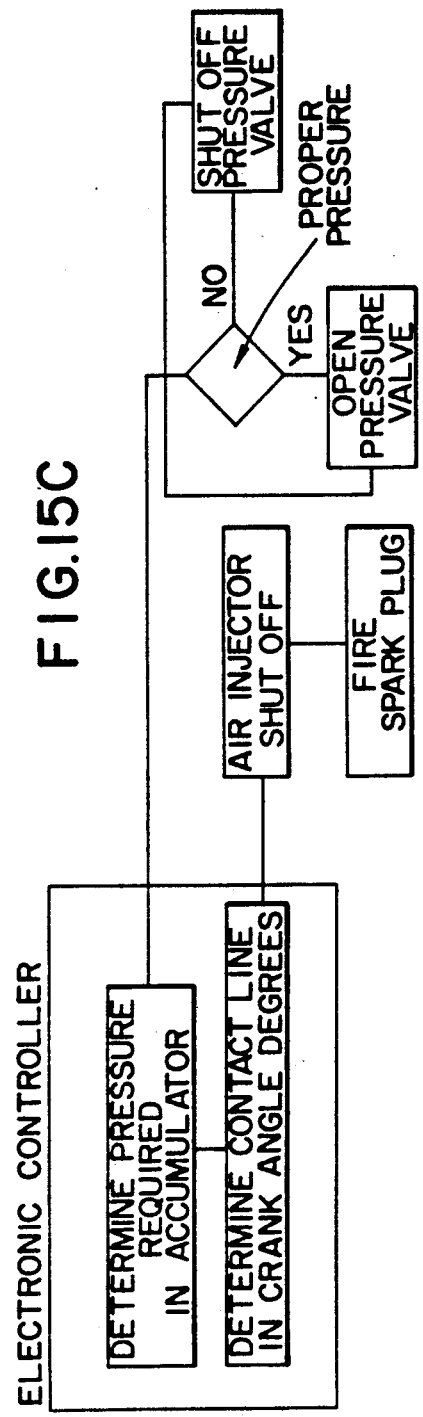

FIGS. 15a through 15c illustrate how the compression ratio can be changed without making any significant hardware changes in the engine. More importantly, changes in the compression ratio can be accomplished during operation of the engine. A change in the compression ratio is accomplished by (1) changing the pressure of the air in the accumulator, (2) changing the position of the contact line of the disc which defines the volume of the combustion chamber, and (3) changing the timing of the air injector valve injection operation, fuel injection and firing in the combustion stage. These changes can be controlled by an electronic controller.

Specifically, changing the pressure in the accumulator is accomplished by using a variable pressure valve, which can be controlled by an electronic controller. In addition, an electronic controller can control the total volume of the combustion chamber and the pre-chamber as well as the timing of firing. Different contact line positions which define different size combustion chamber regions (cross-hatched) are shown in FIG. 15(A) and 15(B). The implications of the variable compression ratio are significant considering it would allow for multi-fuel capability. Such multi-fuel capability would be useful in a number of areas, including military applications.

Referring to the block diagram in FIG. 15(C), the electronic controller determines the pressure required in the accumulator for the specified compression ratio. If the pressure has not been reached, the variable pressure valve closes. Once the pressure has been reached, the variable pressure valve opens. The electronic controller also determines the position of the contact line in terms of a crank shaft angle. When the contact line reaches the desired crankshaft angle, the air injector closes and the spark plug fires to initiate combustion.

Figures 1, 16A:
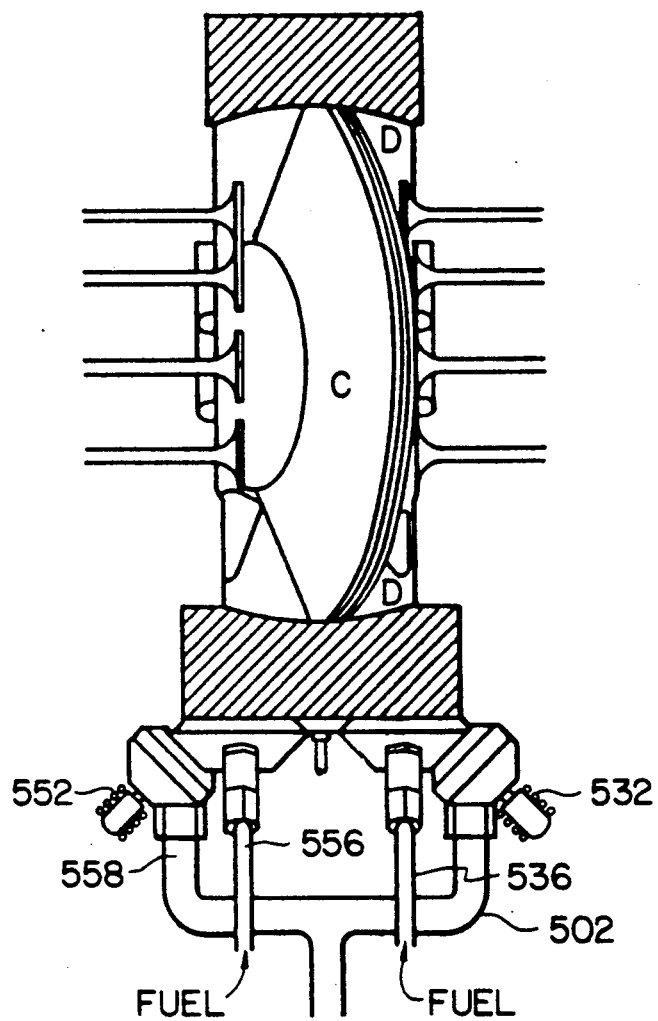

FIG. 16(A) shows the timing of the air and fuel input in the single injector embodiment of the nutating engine as described in FIG. 9. Specifically, FIG. 16(A) shows the input of the fuel and air charge as a function of crankshaft angle. In describing the right section, for example, fuel is added by way of injector 536 for a given period designated by a certain crankshaft angle rotation. Air is also added by opening air injector valve 532. When the crankshaft has reached the required angle for the specified compression ratio, the air injector valve closes and the engine then fires.

Figure 16B:
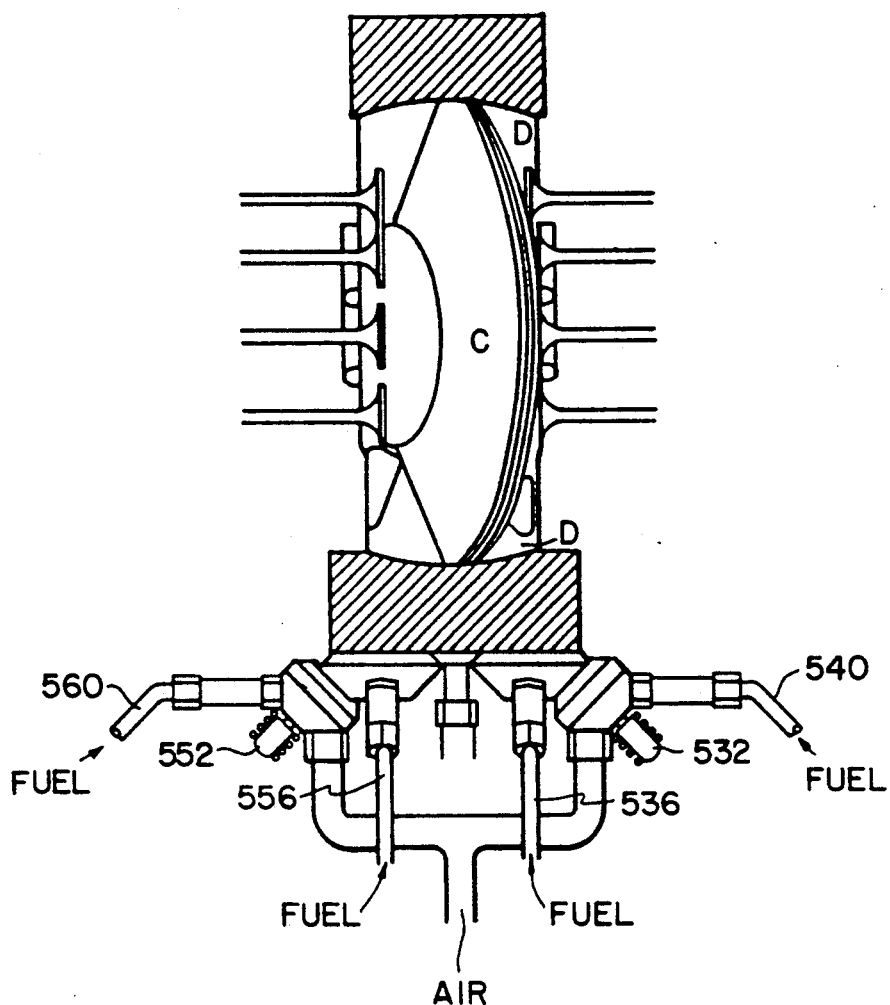
FIG. 16b shows the configuration of the lean fuel injector embodiment of the nutating engine.
Figures 1, 16B:
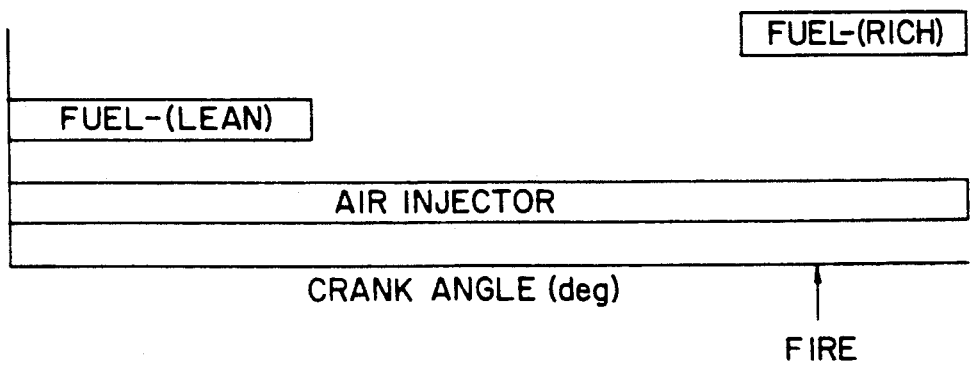
Figure 18:
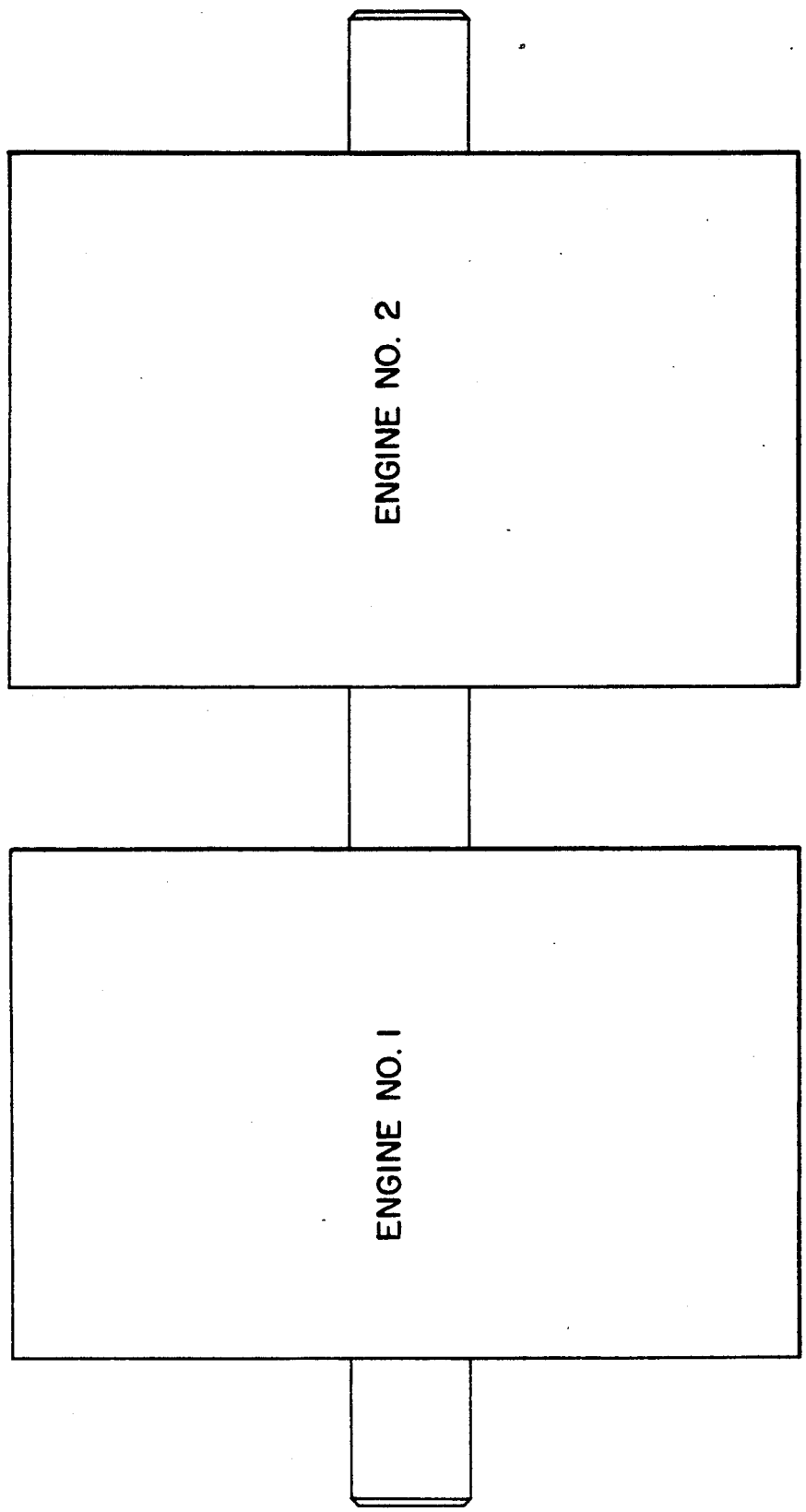
FIG. 18 is a representation of multiple nutating-disc internal combustion engines positioned in series to function together.

FIG. 16(B) shows the embodiment of FIG. 16(A) having an additional lean fuel injector 540 in the right section which is used to form a stratified charge. The fuel from injector 540 is added to the airstream within the air injector while air is being injected to the pre-chamber to form a lean mixture for a certain crankshaft angle duration. Prior to the firing, a certain amount of additional fuel is added by rich fuel injector 536 to form a rich mixture in the pre-chamber. This additional fuel forms a rich mixture in the pre-chamber. A stratified charge is formed in the combustion chamber by this method. The stratified charge is then ignited by spark plug 534. A stratified charge is useful because it allows for more efficient burning.

FIG. 17 shows the various embodiments of positioning the stops 390 and 480. Specifically, depending on the position of the stops, the degree of overlap will vary. Three cases will be described. In the first case, where the stops are positioned symmetrically around the chamber, thereby providing equal volumes in the upper and lower chambers, the overlap in this situation is defined by 90 degrees minus one half of the arc thickness of the stop. For example, if the arc thickness of the stop is 20 degrees, the overlap would be represented by the equation $90 - \frac{1}{2}(20) = 80$ degrees. In the second case depicted in FIG. 17b where the Atkinson Cycle is used, the degree of overlap can be greater than 90 degrees. Specifically, in the Atkinson Cycle, the smaller chamber is used for intake and compression and the larger chamber is used for combustion and exhaust. A net gain in power and efficiency is obtained by allowing a given charge of fuel-air mixture to be ignited and expand to a further degree than would be achieved in a symmetrical stop (equal volume) configuration. Finally, the third case as shown in FIG. 17c is called the Self-Super Charging arrangement where the smaller chamber is used for combustion and exhaust and the larger chamber is used for intake and compression. Here the overlap of the combustion/exhaust stroke can be a maximum of $90 - \frac{1}{2}(a)$ where a is the arc thickness of the stop. The net gain in power is a result of the larger charge of air-fuel mixture than would normally be obtained in a symmetrical stop configuration (equal volumes) due to higher pressures being achieved because of the larger charge.

In addition to the engine disclosed above, it is also contemplated that the nutating structure can be used as a pump, which is a natural extension of this invention. One significant feature of the pump is that there are two means of operating the pump. Specifically, the first means would be a mechanical pump whereby the drive shafts ar used to drive the nutating disc. The chambers will then act as a pump. The second means of operating the pump would be to use one of the chambers as a driving chamber thereby allowing the other chamber to act as a driven chamber. It is important to note that it is possible to use the upper chambers as the drive chambers and use the lower chambers as pump chambers, or to use the left side of the pump (the upper and lower left chambers) as the drive chambers and the right side of the pump (the upper and lower right side of the chamber) for the pump chambers. Also, in regards to the pump, asymmetrical stops and multiple stops can be used to achieve multiple outputs with variable volumes. Therefore, it is possible to use multiple chambers to pump or mix volumes of various sizes or fluid types.

In addition, the structure can be used as a compressor. In a symmetrical stop arrangement, a single stage compressor is achieved. In a non-symmetrical stop arrangement, the larger volume is used for intake and compression and smaller volume is used as a second stage compressor. Specifically, it is possible to use it as a multi-stage compressor where the volume of the second chamber is the same volume as the accumulator. The compressed air from the accumulator is again compressed in the second chamber, thereby forming a multistage compressor.

Although the preferred construction of the nutating engine is described above, various changes may be made without departing from the present invention. For example to provide multiple engine units whereby the coupling of the engine units allow for greater power. For these reasons, the features of the nutating engine which have been described with the accompanying drawings are for purposes of illustration and not limitation. Accordingly, for ascertaining the scope of the present invention, reference must be made to the appended claims.

I claim:

1. A nutating-disc, internal combustion engine comprising:

a nutating-disc having cone-shaped surfaces and a centrally disposed sphere, a symmetrical, spherical-segment shaped chamber adapted to contain said disc, said chamber having a central bearing to movably engage said sphere and to allow said disc to nutate within said chamber, a crankshaft rotationally disposed on the axis of said disc within said sphere, drive shafts disposed on the axis of said chamber positioned on both sides of said chamber, said drive shafts being eccentrically affixed to said crankshaft whereby the nutating motion of said disc causes said drive shafts to turn, said disc having a plurality of gaps, said chamber having a plurality of stops aligned with said gaps to divide said chamber into an intake/compression portion and a combustion/exhaust portion, said disc having a first portion which divides said intake/compression portion into two sections, said disc having a second portion which divides said combustion/exhaust portion into two sections, and wherein at least one of said stops includes at least one port to pass fuel into at least one portion.

2. The nutating-disc internal combustion engine of claim 1, wherein said disc has two gaps.

3. The nutating-disc internal combustion engine of claim 2, wherein said two gaps are positioned 180 degrees apart.

4. The nutating-disc internal combustion engine of claim 1, wherein said crankshaft is positioned at an angle between 10 degrees and 70 degrees with respect to said drive shaft.

5. The nutating-disc internal combustion engine of claim 1, wherein at least one stop includes a port adapted to inject fuel into at least one chamber in the engine.

6. The nutating-disc internal combustion engine of claim 1, wherein at least one of said stops includes an air intake means for supplying air to at least one portion of said chamber.

7. The nutating-disc internal combustion engine of claim 1, wherein one of said stops includes a passage for transmitting fluid to said sphere and disc for lubricating and cooling the disc.

8. The nutating-disc internal combustion engine of claim 7, further including passages within said crankshafts and drive shafts for receiving said fluid from said disc for lubrication and cooling said engine.

9. The nutating-disc internal combustion engine of claim 1, further including a fuel injection system including an accumulator adapted to store compressed air from the intake/compression portion, a pre-chamber, means to inject stored compressed air into said pre-chamber, first means to inject fuel into said pre-chamber and means to ignite the fuel-air mixture.

10. The nutating-disc internal combustion engine of claim 9, further including second fuel input means to provide fuel to said fuel injection system.

11. The nutating-disc internal combustion engine of claim 10, wherein the second fuel input means injects additional fuel to form a stratified charge in said pre-chamber for more efficient firing.

12. The nutating-disc internal combustion engine of claim 10, further including a control means to monitor the pressure of the air in said accumulator, the volume of a combustion section within said combustion/exhaust portion and timing of firing of said means to ignite said air-fuel mixture.

13. The nutating-disc internal combustion engine of claim 12, wherein said control means is an electronic controller.

14. The nutating-disc internal combustion engine of claim 1, wherein said symmetrical, spherical-segment shaped chamber contains flat surfaces disposed perpendicular to said drive shaft.

15. The nutating-disc internal combustion engine of claim 14, wherein said flat surfaces of said combustion/exhaust portion include exhaust ports.

16. The nutating-disc internal combustion engine of claim 15, wherein valves are positioned in said exhaust ports and are operated by cams.

17. The nutating-disc internal combustion engine of claim 16, further including an exhaust manifold positioned over said exhaust ports for releasing gases from the exhaust port.

18. The nutating-disc internal combustion engine of claim 1, wherein said nutating-disc includes a first sealing means positioned at the outer periphery of said disc, said first sealing means comprising two seals along the curved edge of said disc which contacts the chamber.

19. The nutating-disc internal combustion engine of claim 18, wherein said first sealing means comprises two c-rings along the outer periphery of said disc whereby said c-rings urge said seals to maintain a fluid-tight seal between said disc and the chamber wall.

20. The nutating-disc internal combustion engine of claim 19, wherein said disc includes a second sealing means positioned on the portion of said discs adjacent to said steps, wherein said second sealing means provides a seal between said disc and said stop.

21. The nutating-disc internal combustion engine of claim 20, further including a third sealing means including two circular rings positioned within the chamber to seal the sphere within the chamber.

22. The nutating-disc internal combustion engine of claim 21, further including a fourth sealing means having four seals positioned within each stop to seal the sphere within the chamber.

23. The nutating-disc internal combustion engine of claim 1, wherein the disc has a first cooling means including a cavity for circulating fluid to lubricate and cool said disc.

24. The nutating-disc internal combustion engine of claim 23, wherein said cavity of said first cooling means includes a series of passages for allowing coolant to flow through the disc.

25. The nutating-disc internal combustion engine of claim 1, wherein a single exhaust port is positioned adjacent to one of said stops on the spherical shaped wall of the combustion/exhaust portion allowing the exhaust of at least one of said sections.

26. The nutating-disc internal combustion engine of claim 1, including a second cooling means for cooling said intake/compression portion to cause said intake/compression portion to operate at a lower temperature than said combustion/exhaust portion.

27. The nutating-disc internal combustion engine of claim 1, wherein the center of mass of said centrally disposed sphere and disc is stationary at all times.

28. The nutating-disc internal combustion engine of claim 2, wherein said gaps are positioned at an angle between 60 and 180 degrees apart whereby the volume of the intake/compression portion is smaller than the volume of said combustion/exhaust portion.

29. The nutating-disc internal combustion engine of claim 2, wherein said gaps are positioned at an angle between 60 and 180 degrees apart whereby the volume of the intake/compression portion is larger than the volume of said combustion/exhaust portion.

30. The nutating-disc internal combustion engine of claim 28, wherein said disc is asymmetric to maintain a stationary center of mass as said sphere and disc nutate.

31. The nutating-disc internal combustion engine of claim 29, wherein said disc is asymmetric to maintain a stationary center of mass as said sphere and disc nutate.

32. The nutating-disc internal combustion engine of claim 1, wherein multiple nutating-disc internal combustion engines are positioned in series to function together to increase power.

33. A nutating-disc, internal combustion engine comprising:

a nutating-disc having cone-shaped surfaces and a centrally disposed sphere, said disc having two gaps and an edge containing a pair of seals to contain oil for lubrication and cooling;

said sphere having a crankshaft rotationally disposed on the axis of said disc and having a bearing for said crankshaft;

a symmetrical, spherical-segment shaped chamber adapted to contain said sphere and disc, said chamber having a central bearing to movably engage said sphere and to allow said disc to nutate within said chamber;

drive shafts disposed on the axis of said chamber positioned on both sides of said chamber, said drive shafts being eccentrically affixed to said crankshaft whereby the crankshaft is positioned at an angle with respect to the drive shafts such that the nutating motion of said disc causes said drive shafts to turn;

said chamber having two stops aligned with said gaps in said disc, said stops, along with said centrally disposed sphere, divide said chamber into an intake/compression portion and a combustion/exhaust portion, wherein one of said stops includes a fuel input means and one of said stops includes a passage to transmit oil to the sphere and disc to lubricate and cool the engine, and one of said stops includes an air intake means;

said chamber having two flat surfaces disposed perpendicular to said drive shafts said surface containing a plurality of exhaust ports to exhaust gas from said combustion/exhaust portion;

said disc having a first portion and a second portion, wherein said disc first portion divides said intake/compression portion into at least two sections and said second disc portion divides said combustion/exhaust portion into at least two sections; and a fuel injection system including an accumulator adapted to store compressed air from said intake/compression sections, a pre-chamber, means to inject stored compressed air into said pre-chamber, a first means to inject fuel into said pre-chamber and means to ignite the fuel-air mixture.

34. The nutating-disc internal combustion engine of claim 33, further including second fuel input means to provide fuel to said fuel injection system.

35. The nutating-disc internal combustion engine of claim 34, wherein said second fuel input means injects additional fuel to form a stratified charge in the pre-chamber for more efficient firing.

36. The nutating-disc internal combustion engine of claim 33, wherein the nutating engine has a first cooling means for cooling the intake/compression section to cause the intake/compression section to operate at a lower temperature than the combustion/exhaust section.

37. The nutating-disc internal combustion engine of claim 33, wherein the disc has a second cooling means includes a cavity within said disc for cooling the disc.

38. The nutating-disc internal combustion engine of claim 37, wherein said cavity of said second cooling means includes a series of passages for allowing coolant to flow through the disc.

39. The nutating-disc internal combustion engine of claim 33, wherein said a single exhaust port is positioned adjacent to one of said stops on the spherical segmented wall of the combustion/exhaust portion allowing the exhaust of at least one of said sections.

40. The nutating-disc internal combustion engine of claim 33, further including a fuel input means to provide fuel to said fuel injection system.

41. The nutating-disc internal combustion engine of claim 40, further including a control means to monitor the pressure of the air in said accumulator, the volume of a combustion section within said combustion/exhaust portion and timing of firing of said means to ignite said air-fuel mixture.

42. The nutating-disc internal combustion engine of claim 41, wherein said control means is an electronic controller.

43. The nutating-disc internal combustion engine of claim 33, wherein said gaps are positioned 180 degrees apart.

44. The nutating-disc internal combustion engine of claim 43, wherein the center of mass of the centrally disposed sphere and disc is stationary at all times.

45. The nutating-disc internal combustion engine of claim 33, wherein said gaps are positioned at an angle between 60 and 180 degrees apart whereby the volume of the intake/compression portion is larger than the volume of said combustion/exhaust portion.

46. The nutating-disc internal combustion engine of claim 33, wherein said gaps are positioned at an angle between 60 and 180 degrees apart whereby the volume of the intake/compression portion is smaller than the volume of said combustion/exhaust portion.

47. The nutating-disc internal combustion engine of claim 41, wherein said disc is asymmetric to maintain a stationary center of mass as said sphere and disc nutate.

48. The nutating-disc internal combustion engine of claim 47, wherein said disc is asymmetric to maintain a stationary center of mass as said sphere and disc nutate.

49. The nutating-disc internal combustion engine of claim 33, wherein multiple nutating-disc internal combustion engine are positioned in series to function together to increase power.

50. A nutating-disc, internal combustion engine comprising:

a nutating-disc having cone-shaped surfaces and a centrally disposed sphere, said disc having two gaps positioned 180 degrees apart;

said centrally disposed having a shaft positioned therein to contain a crankshaft rotationally disposed on the axis of said disc wherein said center of mass of said centrally disposed sphere and disc is stationary at all times;

a symmetrical, spherical-segment shaped chamber adapted to contain said disc, said chamber having a central bearing positioned to movably engage said sphere and to allow said disc to nutate within said chamber;

drive shafts disposed on the axis of said chamber positioned on both sides of said chamber, said drive shafts being eccentrically affixed to said crankshaft whereby the crankshaft is positioned at an angle with respect to the drive shafts such that the nutating motion of said disc causes said drive shafts to turn;

said chamber having two stops aligned with said gaps in said disc, which along with said centrally disposed sphere, divide said chamber into an intake/compression portion and a combustion/exhaust portion, said first step arranged to inject fuel to at least one portion and to inject oil into said sphere and disc for cooling, and said second stop arranged to inject air to said chamber;

said chamber having two flat surfaces disposed perpendicular to said drive shafts and having a plurality of exhaust ports to exhaust gas from said combustion/exhaust portion;

an exhaust manifold coupled to said exhaust ports to provide an outlet from said exhaust ports;

said disc having a first portion and a second portion, whereby said disc first portion divides said intake/compression portion into at least two sections and said disc second portion divides said combustion/exhaust portion into at least two sections; said disc having an edge containing a first sealing means including a pair of c-ring seals to provide a seal between the disc and the spherical segmented walls of the chamber and to contain oil for lubrication and cooling, a second sealing means between the disc and the step, a third sealing means positioned within the chamber to seal the sphere within the chamber and a fourth sealing means having four seals positioned within each stop to seal the sphere within the chamber;

a first cooling means for cooling the intake/compression portion to cause the intake/compression portion to operate at a lower temperature than the combustion/exhaust portion;

a second cooling means wherein said stops includes passages to transmit a coolant to a series of passages within the sphere and disc to lubricate and cool the engine;

an air intake means for providing air to the internal combustion engine;

a fuel injection system including a fuel input for providing fuel to said fuel injection system, a pre-chamber, an accumulator adapted to store compressed air from the intake/compression portion, a first injection means to combine stored compressed air with fuel to form a lean mixture and inject the combined lean air-fuel mixture into said pre-chamber, a second injection means to inject an additional charge of fuel to said air-fuel mixture within said pre-chamber to form a stratified charge for more efficient firing and a spark plug to ignite the stratified charge; and an electronic control means to monitor the pressure of the air in said accumulator, the volume of a combustion section within said combustion/exhaust portion and timing of igniting of said stratified charge.

51. The nutating-disc internal combustion engine of claim 50, wherein multiple nutating-disc internal combustion engines are positioned in series to function together to increase power.

52. The nutating-disc internal combustion engine of claim 19 wherein each of said c-rings has an open side which is disposed to face parallel to the axis of said disc.

53. The nutating-disc internal combustion engine of claim 19 wherein each of said c-rings has an open side which is disposed to face away from the center plane of said disc.

54. The nutating-disc internal combustion engine of claim 15, wherein a single exhaust port is positioned adjacent to one of said stops on the spherical shaped wall of the combustion/exhaust portion allowing the exhaust of at least one of said sections.

* * * * *

UNITED STATES PATENT AND TRADEMARK OFFICE
CERTIFICATE OF CORRECTION

PATENT NO. : 5,251,594
DATED : October 12, 1993
INVENTOR(S) : Leonard Meyer

It is certified that error appears in the above-indentified patent and that said Letters Patent is hereby corrected as shown below:

Col. 19, ln. 65 (Claim 39) - delete the word "said".

Signed and Sealed this

Fourth Day of April, 1995

Attest:

BRUCE LEHMAN

Attesting Officer        Commissioner of Patents and Trademarks